US011470026B2

(12) United States Patent
Paul

(10) Patent No.: US 11,470,026 B2
(45) Date of Patent: *Oct. 11, 2022

(54) SOCIAL NETWORKING INTERACTIONS WITH PORTIONS OF DIGITAL VIDEOS

(71) Applicant: Meta Platforms, Inc., Menlo Park, CA (US)

(72) Inventor: Debashish Paul, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,123

(22) Filed: Jul. 1, 2019

(65) Prior Publication Data
US 2019/0342242 A1 Nov. 7, 2019

Related U.S. Application Data

(63) Continuation of application No. 14/982,449, filed on Dec. 29, 2015, now Pat. No. 10,341,405.

(51) Int. Cl.
| | |
|---|---|
| *G06F 15/16* | (2006.01) |
| *H04L 51/10* | (2022.01) |
| *H04N 21/00* | (2011.01) |
| *H04N 21/472* | (2011.01) |
| *H04N 21/845* | (2011.01) |

(Continued)

(52) U.S. Cl.
CPC ............. *H04L 51/10* (2013.01); *H04L 51/52* (2022.05); *H04L 67/535* (2022.05); *H04N 21/00* (2013.01); *H04N 21/472* (2013.01); *H04N 21/8456* (2013.01); *H04W 4/21* (2018.02)

(58) Field of Classification Search
CPC ......... H04L 51/10; H04L 51/32; H04L 67/22; H04N 21/00; H04N 21/472; H04N 21/8456; H04W 4/21
USPC ..... 709/206, 201, 217; 725/14, 41; 715/202, 715/760
See application file for complete search history.

(56) References Cited

U.S. PATENT DOCUMENTS 9,704,231 B1 7/2017 Kulewski et al.
9,762,629 B1 * 9/2017 Bhargava ................ H04L 65/40
(Continued)

OTHER PUBLICATIONS

U.S. Appl. No. 14/982,449, Oct. 20, 2017, Office Action.
(Continued)

*Primary Examiner* — Thuong Nguyen
(74) *Attorney, Agent, or Firm* — Keller Preece PLLC

(57) ABSTRACT

The present disclosure is directed toward systems and methods for interacting with portions of digital video within a social networking system. For example, systems and methods described herein enable a user to select a portion of a digital video and share or like just the portion of the digital video, rather than the entire digital video. The present disclosure is also directed toward systems and methods for identifying viral portions of a digital video within a social networking system. For example, systems and methods described herein analyze social networking activity related to portions of a particular digital video to identify one or more viral portions of the digital video. In response to identifying one or more viral portions, systems and methods provide an indication of, or otherwise share, the one or more viral portions during playback of the digital video.

20 Claims, 15 Drawing Sheets

(51) Int. Cl.
    *H04L 51/52*     (2022.01)
    *H04L 67/50*     (2022.01)
    *H04W 4/21*     (2018.01)

(56) References Cited

U.S. PATENT DOCUMENTS

| | | | |
|---|---|---|---|
| 10,032,145 B1* | 7/2018 | Zack | G06Q 30/0251 |
| 10,341,405 B2* | 7/2019 | Paul | H04N 21/44226 |
| 2008/0126345 A1* | 5/2008 | Podilchuk | G06F 16/40 |
| | | | 707/999.005 |
| 2012/0237183 A1* | 9/2012 | Chen | H04N 7/17318 |
| | | | 386/E9.011 |
| 2013/0216203 A1* | 8/2013 | Nakazawa | H04N 21/252 |
| | | | 386/241 |
| 2014/0122601 A1* | 5/2014 | Poston | H04N 21/4307 |
| | | | 709/204 |
| 2014/0245336 A1 | 8/2014 | Lewis et al. | |
| 2015/0139610 A1* | 5/2015 | Syed | G11B 27/11 |
| | | | 386/241 |
| 2015/0235672 A1* | 8/2015 | Cudak | H04N 21/252 |
| | | | 386/241 |
| 2015/0281756 A1* | 10/2015 | Soon-Shiong | H04N 21/6582 |
| | | | 725/14 |
| 2015/0319474 A1* | 11/2015 | Earle | H04N 21/2668 |
| | | | 725/32 |
| 2016/0232497 A1* | 8/2016 | Jewett | G06Q 50/01 |
| 2016/0277328 A1* | 9/2016 | Ishizuka | H04N 21/4316 |
| 2016/0295264 A1* | 10/2016 | Yanovsky | H04N 21/4622 |
| 2017/0017652 A1* | 1/2017 | Neumeier | H04N 21/252 |
| 2017/0171139 A1 | 6/2017 | Marra et al. | |
| 2018/0102144 A1* | 4/2018 | Nomula | G11B 27/322 |
| 2018/0132011 A1* | 5/2018 | Shichman | G11B 27/28 |

OTHER PUBLICATIONS

U.S. Appl. No. 14/982,449, Apr. 5, 2018, Office Action.
U.S. Appl. No. 14/982,449, Aug. 28, 2018, Office Action.
U.S. Appl. No. 14/982,449, Feb. 14, 2019, Notice of Allowance.

* cited by examiner

SOCIAL NETWORKING INTERACTIONS WITH PORTIONS OF DIGITAL VIDEOS

CROSS REFERENCE TO RELATED APPLICATIONS

This application is a continuation of U.S. patent application Ser. No. 14/982,449, filed Dec. 29, 2015. The aforementioned application is hereby incorporated by reference in its entirety.

BACKGROUND

1. Technical Field

One or more embodiments disclosed herein relate generally to a social networking system. More specifically, one or more embodiments disclosed herein relate to sharing videos over a social networking system.

2. Background and Relevant Art

Online video watching is an increasingly popular pastime among Internet users. For example, users frequently go online to watch movies, TV episodes, news and weather reports, and other types of video clips. Thus, users can watch video online via web-enabled televisions, smart phones, tablets, smart wearables, etc.

As watching videos online becomes more popular, it has also become increasingly common for users to share videos via a social networking system. For instance, in response to watching a humorous video online, a social networking system user may wish to bring the humorous video to the attention of friends, family members, and/or acquaintances. Accordingly, social networking systems typically provide one or more mechanisms by which the user can share the humorous video with other social networking system users who are associated with the user (e.g., "friends"). For example, in response to the user selecting an option to share a video, the social networking system can add a link or video player control to the newsfeeds of the user's friends, such that the user's friends can view the video as well.

When sharing videos via a social networking system, however, users typically encounter various problems. For example, a video sharer may only want to share a particular portion or segment of a video with his social networking system friends, rather than having them watch the entire video. In order to point out only a portion of a video, the video sharer typically adds instructions to the video (e.g., via a comment or tag) that state a timestamp within the video where other users should begin watching the video (e.g., "Hey, the funny part starts at about 2 minutes in!"). Thus, in order to watch the indicated portion, the video sharer's friends must scroll through the video to the right timestamp. This extra hassle frequently deters the video sharer's friends from watching the video at all.

In some cases, a video sharer may attempt to edit the video in order to extract only a portion of the video to share via a social networking system. This approach is also problematic for various reasons. For example, video-editing software is typically expensive and requires a large amount of resources to run successfully. Additionally, editing videos may run the video sharer afoul of various copyright standards.

Further problems arise with regard to "viral" videos. For example, a viral video is one that has become extremely popular and is frequently viewed by Internet users. A social networking system user may wish to share a popular video that has become viral with his friends via a social networking system, when only a portion of the viral video is truly what watchers are interested in seeing. When the user's social networking friends watch the viral video, they generally have no indication of what portion of the video that has made the video popular enough to become viral. Thus, the user's social networking friends typically watch the entire video when only a portion of the video is the reason the video has become viral, which is a waste of time. Alternatively, the user's social networking friends may skip the video altogether.

Thus, there are several disadvantages to current methods for sharing videos via a social networking system.

SUMMARY

One or more embodiments described herein provide benefits and/or solve one or more of the foregoing or other problems in the art with systems and methods for sharing portions of videos via a social networking system. One or more embodiments described herein include systems and methods for sharing portions of videos by enabling a user to select a portion of a video that the user would like to share with one or more co-users via the social networking system. Thus, rather than having to point out a timestamp within the video that co-users should scroll to, the user can select the exact portion of the video that co-users should watch.

Additionally, one or more embodiments described herein include systems and methods for indicating viral portions of popular videos. For example, systems and methods described herein track the most-shared portions of a particular video in order to identify a viral portion of the video. Thus, when social networking system users watch the viral video, systems and methods described herein provide an indication of the most popular portion or portions of the viral video. In this way, social networking system users are spared the hassle of watching a long video when only a portion of that video is truly viral.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which.

DETAILED DESCRIPTION

Figure 1:
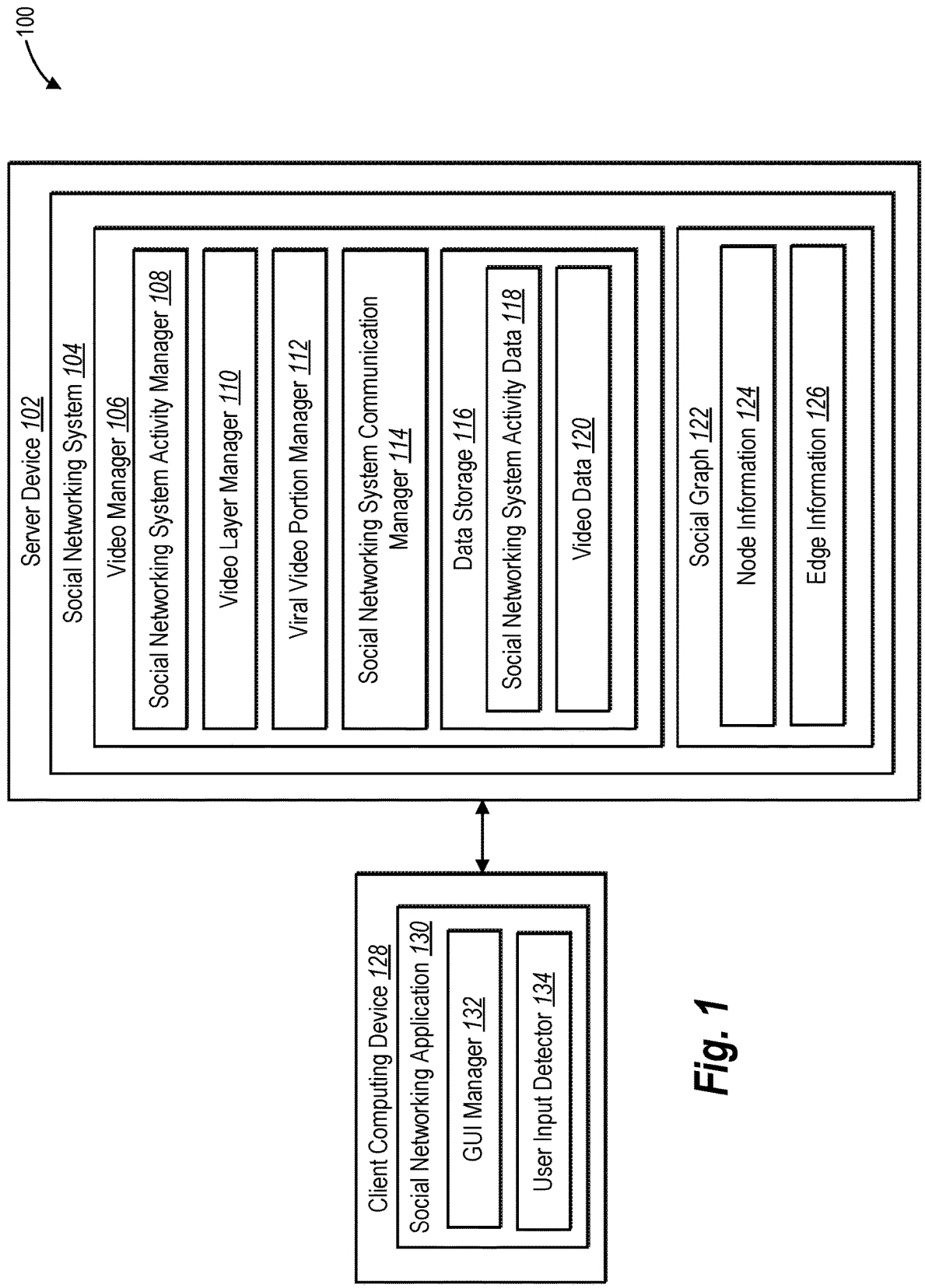
FIG. 1 illustrates a detailed schematic diagram of a video management system in accordance with one or more embodiments.

One or more embodiments described herein provide benefits and/or solve one or more of the foregoing or other problems in the art with systems and methods for sharing videos via a social networking system. For example, the video management system of one or more embodiments described herein can enable a user to select a portion of a video to share with other users via a social networking system. Similarly, the video management system of one or more embodiments described herein can track frequently shared portions of a particular video within the social networking system in order to identify a portion of the particular video that has become viral.

To illustrate, in response to a social networking system user indicating a desire to "like" and/or "share" a particular video among other associated social networking system users, the video management system provides editing controls that allow the user to select a specific portion of the particular video. For example, in at least one embodiment, the editing controls provided by the video management system are timeline handles that allow the user to drag a starting timeline handle to the point in a video timeline at which the specific portion of the video begins, and to drag an ending timeline handle to the point in the video timeline at which the specific portion of the video ends.

In response to a user selecting a specific portion of the particular video, the video management system generates a video file layer that indicates the starting and ending points of the specific portion within the particular video. In one or more embodiments, the social networking system adds the particular video to the newsfeeds of the user's social networking system "friends" (e.g., associated co-users) along with the video file layer such that the particular video auto-plays the specific portion selected by the user in the newsfeeds of the user's friends. Thus, the user's friends can see the selected portion right away without having to watch the entire video, or manually scroll to a particular timestamp within the video.

Furthermore, in one or more embodiments, the video management system tracks all social networking system activity associated with a particular video in order to identify a viral portion or portions of the particular video. For example, the video management system can track all "likes" and "shares" associated with various portions of the video in order to identify the most liked and/or shared video portion (s). The video management system may determine that a number of likes and/or shares associated with a particular video portion exceeds a threshold amount to qualify the video portion as a "viral portion." Additionally, the video management system can analyze all video file layers associated with a particular video in order to identify one or more portions of the video that have been shared and/or liked by a threshold number of social networking system users and are thus "viral." In at least one embodiment, after identifying one or more viral portions of a particular video, the video management system indicates the viral portion of the video every time a social networking system user plays the video.

As used herein, the term "social networking system" refers to a system that supports and enables on-line communication, input, interaction, content-sharing, and collaboration between users. A user of the social networking system can have one or more "friends" via the social networking system. As used herein, the term "friend" refers to a co-user associated with a user via the social networking system (i.e., a contact or connection within a user's social network).

As mentioned above, the social networking system can monitor social networking system activity to identify a portion of a video that a social networking system user wishes to like and/or share. Similarly, the social networking system can monitor social networking system activity to determine that a portion of a video has become viral. As used herein, "social networking system activity" refers to an interaction between a social networking system user and the social networking system. For example, the social networking system provides various input controls that allow a user to comment on a post within a newsfeed, to "like" (e.g., indicate agreement with or support for) a post within a newsfeed, to share a post, article, video, etc. with other social networking system users, to read an article or play a video shared by another social networking system user, and so forth. Also as used herein, a digital video is considered "viral" when it has been circulated and viewed rapidly and widely among a threshold number of social networking system users, in accordance with one or more pre-determined thresholds and/or heuristics.

FIG. 1 illustrates a schematic diagram illustrating an example embodiment of a video management system 100 (or simply "system 100"). As shown in FIG. 1, the system 100 may include various components for performing the processes and features described herein. For example, as shown in FIG. 1, the system 100 may include, but is not limited to, one or more server devices 102, a social networking system 104, a video manager 106, and at least one client computing device 128. The video manager 106 can include, but is not limited to, a social network system activity manager 108, a video layer manager 110, a viral video portion manager 112, a social networking system communication manager 114, and a data storage 116, which includes social networking system activity data 118 and video data 120. The social networking system 104 may also include a social graph 122, which includes node information 124 and edge information 126. The client computing device 128 can include a social networking application 130, which includes a display manager 132 and a user input detector 134.

The social networking system 104, each of the components 108-122, and each of the components 132-134 of the social networking application 130 can be implemented using a computing device including at least one processor executing instructions that cause the system 100 to perform the processes described herein. In some embodiments, the components 102-134 can be implemented by a single server device 102, or across multiple server devices 102. Additionally or alternatively, a combination of one or more server devices and one or more client devices (e.g., client computing device 128) can implement the components 102-134.

Furthermore, in one embodiment, the components 102-134 can comprise hardware, such as a special-purpose processing device to perform a certain function. Additionally or alternatively, the components 102-134 can comprise a combination of computer-executable instructions and hardware.

In one or more embodiments, the social networking application 130 can be a native application installed on the client computing device 128. For example, the social networking application 130 may be a mobile application that installs and runs on a mobile device, such as a smart phone or a tablet. Alternatively, the social networking application 130 can be a desktop application, widget, or other form of a native computer program. Alternatively, the social networking application 130 may be a remote application accessed by the client computing device 128. For example, the social networking application 130 may be a web application that is executed within a web browser of the client computing device 128.

As mentioned above, and as shown in FIG. 1, the social networking application 130 can include a graphical user interface (or simply "GUI") manager 132. The GUI manager 132 can provide, manage, and/or control a graphical user interface (or simply "user interface") that allows a user to compose, view, and submit electronic messages, social networking system posts, digital videos, and/or other content. Furthermore, the GUI manager 132 can provide a user interface that facilitates display of digital videos. Likewise, the GUI manager 132 can provide a user interface that facilitates the display of a social networking system user's newsfeed or wall.

More specifically, the GUI manager 132 can facilitate the display of a user interface (e.g., by way of a display device associated with the client computing device 128). For example, the GUI manager 132 may compose the user interface of a plurality of graphical components, objects, and/or elements that allow a user to compose, send, and receive electronic messages, social networking system posts, etc. More particularly, the GUI manager 132 may direct the client computing device 128 to display a group of graphical components, objects, and/or elements that enable a user to view social networking system posts, digital videos, etc.

In addition, the GUI manager 132 may direct the client computing device 128 to display one or more graphical objects, controls, applications, or elements that facilitate user input for composing and sending posts, and/or viewing digital videos and other digital media. To illustrate, the GUI manager 132 may provide a user interface that allows a user to provide user input to the social networking application 130. For example, the GUI manager 132 can provide one or more user interfaces that allow a user to input one or more types of content into a social networking system post, an electronic message, etc. As used herein, "content" refers to any data or information to be included as part of a social networking system post, message, comment, etc. For example, the term "content" will be used herein to generally describe text, images, applications, digital media (e.g., digital videos), files, location information, or any other data that can be included as part of a social networking system post, message, comment, etc.

One example of an application provided by the GUI manager 132 is a video application. For instance, the GUI manager 132 can provide a video application that allows a user to watch and otherwise interact with a digital video (e.g., a digital video available through the social networking system 104). In one or more embodiments, the video application provided by the GUI manager 132 includes one or more controls that allow a user to control playback of a digital video, like or share a digital video, comment on a digital video, select one or more portions of a video, and receive an indication of one or more viral portions of a video. In at least one embodiment, the GUI manager 132 can provide the video application in a standalone window. In additional or alternative embodiments, the GUI manager 132 can embed the video application in a newsfeed of a social networking system user such that the video application provides a video preview window within a post in the newsfeed of the social networking system user.

The GUI manager 132 can also facilitate the input of text or other data to be included in a social networking system post, message, comment, etc. For example, the GUI manager 132 can provide a user interface that includes a touch display keyboard or any other touch-responsive graphical elements. A user can interact with the touch display keyboard using one or more touch gestures to input text or other types of input to be included in a social networking system post, message, or comment. In addition to text, the user interface including the touch display keyboard can facilitate the input of various other characters, symbols, icons, or other information.

Furthermore, the GUI manager 132 can provide and transition between two or more graphical user interfaces. For example, in one embodiment, the GUI manager 132 can provide a newsfeed to a social networking system user containing one or more social networking system posts from co-users associated with the user via the social networking system. Later, in response to detected input from the user, the GUI manager 132 can transition to a second graphical user interface that includes a video application for viewing a digital video.

As further illustrated in FIG. 1, the social networking application 130 can include a user input detector 134. In one or more embodiments, the user input detector 134 can detect, receive, and/or facilitate user input in any suitable manner. In some examples, the user input detector 134 can detect one or more user interactions with respect to the user interface. As referred to herein, a "user interaction" means a single interaction, or combination or interactions, received from a user by way of one or more input devices.

For example, the user input detector 134 can detect a user interaction from a keyboard, mouse, touch pad, touch screen, and/or any other input device. In the event the client computing device 128 includes a touch screen, the user input detector 134 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 134 may additionally, or alternatively, receive data representative of a user interaction. For example, the user input detector 134 may receive one or more user configurable parameters from a user, one or more user commands from the user, and/or any other suitable user input. The user input detector 134 may receive input data from one or more components of the social networking system, or from one or more remote locations.

The social networking application 130 can perform one or more functions in response to the user input detector 134 detecting user input and/or receiving other data. Generally, a user can control, navigate within, and otherwise use the social networking application 130 by providing one or more user inputs that the user input detector 134 can detect. For example, in response to the user input detector 134 detecting user input, one or more components of the social networking application 130 allow a user to select a recipient for a message, compose a message, select content to include in a message, and/or send a message to the recipient. Additionally, in response to the user input detector 134 detecting user input, one or more components of the social networking application 130 allow a user to navigate through one or more user interfaces to review electronic messages, view and share digital videos, etc.

As illustrated in FIG. 1, the video management system 100 can include the social networking system 104 hosted by the server device 102. The social networking system 104 can provide social networking system posts (whether text or otherwise) to a graphical user interface (e.g., a profile, a newsfeed, or "wall") of one or more users of the social networking system 104. For example, one or more embodiments may present a user with a social networking system newsfeed. In one or more embodiments, the user may scroll through the social networking system newsfeed in order to view recent social networking system posts submitted by the one or more co-users associated with the user via the social networking system 104. In one embodiment, the social networking system 104 may organize the social networking system posts geographically, by interest groups, according to a relationship coefficient between the user and the co-user, etc. Additionally, in one or more embodiments, the user may download content from the newsfeed and the social networking system posts displayed therein.

Additionally, in one embodiment, the social networking system 104 can transmit social networking system posts between users. For example, in response to a user submitting a social networking system post to the social networking system 104, the social networking system 104 can update the social networking system newsfeeds of the co-users who are "friends" with the user to include the submitted social networking system post. Accordingly, over time, the social networking system 104 fills the newsfeed of a particular social networking system user with the posts (e.g., including shared content such as shared videos) submitted by the user's friends.

As mentioned above, and as illustrated in FIG. 1, the social networking system 104 further includes the video manager 106. In one or more embodiments, and as will be discussed in further detail below, the video manager 106 monitors and manages activity within the social networking system 104 related to digital videos. The video manager 106 also includes a social networking system activity manager 108, which in turn can communicate with the social networking system 104 to receive various types of information. In one or more embodiments, the social networking system activity manager 108 can receive information related to actions performed by social networking system users, as well as information related to the social networking system users.

For example, the social networking system activity manager 108 can receive information related to the social networking system activities engaged in by one or more social networking system users. To illustrate, a social networking system user may click links, "like" posts, add comments, view digital media, etc. Accordingly, the social networking system activity manager 108 can receive, monitor, and track information related to any and all social networking system activities performed by a social networking system user. In one or more embodiments, the social networking system activity manager 108 can identify the content of posts, electronic messages, and comments, as well as any structured data associated with a post, electronic message, comment, etc.

Furthermore, the social networking system activity manager 108 can receive information related to digital video interactions engaged in by one or more social networking system users. For example, as mentioned above, social networking system users can watch, share, and select portions of digital videos via the social networking system 104 and the social networking application 130, as will be explained in more detail below. Accordingly, the social networking system activity manager 108 can receive, monitor, and track information related to any digital video interactions performed by a social networking system user.

As mentioned above, the social networking system activity manager 108 can receive information related to a social networking system user including demographic information associated with the user. In one or more embodiments, a user's demographic information can include, but is not limited to, the user's gender, age, education, location, hometown, birthday, employment, salary, family and romantic relationships, and so forth. Additionally, the user's demographic information can be related to the user's personal interests (e.g., favorite books, movies, restaurants, etc.). The social networking system activity manager 108 can identify this information through an analysis of the user's social networking system profile, account information, or via other social networking system activities in which the user engages.

As mentioned above, and as illustrated in FIG. 1, the video manager 106 also includes a video layer manager 110. As discussed above, the video management system 100 enables a social networking system user to select a portion of a particular video to like and/or share with one or more friends. Accordingly, in one or more embodiments, the video manager 106 detects the user's selection of a portion of the particular video. For example, in response to the user indicating a desire to select a portion of a video, the GUI manager 132 of the social networking application 130 can provide a video application including at least two timeline handles that allow the user to indicate a starting timestamp and an ending timestamp of the selected portion. In one or more embodiments, the video layer manager 110 detects the user's positioning of the timeline handles, and identifies the starting timestamp and ending timestamp of the selected video portion. In additional embodiments, the video layer manager 110 can provide additional timeline handles for a user to select additional video portions to share simultaneously or subsequently.

Additionally, in one or more embodiments, the video layer manager 110 creates a video file layer for each selected portion of a particular video. For example, in response to a user dragging timeline handles within a video application in order to select a portion of a digital video, the video layer manager 110 creates a video file layer that includes a starting timestamp associated with the starting timeline handle (e.g., indicating the beginning of the selected portion within the video), and an ending timestamp associated with the ending timeline handle (e.g., indicating the ending of the selected portion within the video). Additionally, the video layer manager 110 includes additional information in the video file layer such as a unique identifier associated with the digital video, and a unique identifier associated with the social networking system user who selected the portion of the digital video.

Furthermore, the video layer manager 110 also stores the created video file layer. In one or more embodiments, in order to prevent storage of multiple copies of the digital video, the video layer manager 110 can store a created video file layer in one of several different ways. For example, the video layer manager 110 can create a storage node for the video file layer and associate the node with the user who selected the video portion. Thus, over time as the user selects additional portions of the same or other digital videos, the video layer manager 110 can associate additional nodes containing video file layers with the user.

Alternatively, the video layer manager 110 can store a node containing the created video file layer in association with the digital video. For example, the video layer manager 110 can store the node in association with the digital video identified by a unique digital video identifier included in the video file layer. Thus, over time as additional social networking system users select portions of the digital video, the video layer manager 110 will associate additional video file layer nodes with the digital video. In additional or alternative embodiments, the video layer manager 110 may store a created video file layer based on a combination of the methods described above or using any other suitable data storage methods.

Regardless of the storage scheme utilized (e.g., creating a storage node for the video file layer and associate the node with the user who selected the video portion, or associating video file layer nodes with a single video file layer node for the digital video), each video file layer points to a common storage location of the digital video. For example, once a social networking system user uploads a digital video to the social networking system, the social networking system stores a single copy of the digital video in a particular location. Thus, each subsequent video file layer that references the digital video will include that particular storage location. This ensures that the social networking system efficiently utilizes storage space by only maintaining a single copy of the digital video, rather than creating multiple copies of the digital video each time a social networking system user interacts with the digital video.

As mentioned above, and as illustrated in FIG. 1, the video manager 106 also includes a viral video portion manager 112. In one or more embodiments, the viral video portion manager 112 identifies viral portions of digital videos. As described above, any type of digital media becomes viral when it is quickly and widely circulated and viewed by a threshold number of users. Accordingly, over time, a particular digital video may be associated with many shares and corresponding video file layers, each indicating one or more portions of the digital video that social networking system users have liked and/or shared. In addition, the viral video portion manager 112 can utilize these video file layers and data representative of social networking system user interactions (e.g., likes, shares, comments, views, etc.) to determine the virality of video portions.

In one or more embodiments, in order to identify one or more viral portions of a particular video, the viral video portion manager 112 can begin by identifying all video file layers associated with the particular video. In one or more embodiments, the viral video portion manager 112 identifies video file layers associated with the particular video by searching for all video file layers that include a unique identifier associated with the particular video. For example, the unique identifier associated with the particular video can be an alpha-numeric string of characters (e.g., a stock keeping unit, etc.), a number, a title, a description, etc.

Once the viral video portion manager 112 has identified all video file layers associated with the particular video, the viral video portion manager 112 can continue the process of identifying one or more viral portions of the particular video by instantiating a counter, and working through the following analysis of the identified video file layers: start at the first timestamp within the particular video, determine whether any of the video file layers contain a starting timestamp that matches the first timestamp, for each video file layer that contains a starting timestamp that matches the first timestamp add one to the counter, and move to the next timestamp within the particular video. When the counter reaches a number at or beyond a threshold amount, the viral video portion manager 112 can determine that a viral video portion starts at the current timestamp within the particular video. In one or more embodiments, the viral video portion manager 112 can assign a particular value as the threshold amount (e.g., 1000). Alternatively, the viral video portion manager 112 can determine that the threshold amount is a certain percentage of the total number of viewers of the particular video (e.g., if the video has been viewed by 1000 users, the threshold amount may be 80% of the total number of viewers, or 800).

Once the viral video portion manager 112 increases the counter past zero, the viral video portion manager 112 can determine whether any of the video file layers contain an ending timestamp that matches the current timestamp, as the viral video portion manager 112 moves through the timestamps within the particular video. For each video file layer that contains an ending timestamp that matches the current timestamp, the viral video portion manager 112 subtracts one from the counter. If the viral video portion manager 112 has previously determined that a viral portion of the particular video has started and the counter falls below the threshold amount, the viral video portion manager 112 can then determine that the viral portion ends at the current timestamp. In this way, by working timestamp by timestamp through the particular video, the viral video portion manager 112 can identify one or more viral portions of the particular video.

In additional or alternative embodiments, the viral video portion manager 112 also takes additional social networking system activity associated with a digital video into account in identifying one or more viral portions of the digital video. For example, in some embodiments, in addition to sharing portions of a digital video, social networking users can "like" portions of the digital video, view portions of the digital video, and/or comment on portions of the digital video. To illustrate, a social networking user may select a portion of a digital video and submit a comment specific to the selected portion (e.g., "This is the part with the awesome guitar solo!").

In that case, the video layer manager 110 associates the user's submitted comment with, for example, a video file layer associated with the corresponding portion of the digital video. The video layer manager 110 can create video file layers or modify video file layers to represent or track any type of social networking system activity connected with the digital video. Later, when identifying viral portions of the digital video, the viral video portion manager 112 will identify the video file layer created for the submitted comment (or any other social networking system activity), and take in account any timestamps included in the identified video file layer(s) in the resulting count. In at least one embodiment, the viral video portion manager 112 adds a weight to certain types of social networking system activity indicated by each identified video file layer. For example, the viral video portion manager 112 may assign a heavier weight to a video file layer that indicates a particular portion of the digital video was shared than to a video file layer that indicates a particular portion of the digital video was merely viewed. Thus, the viral video portion manager 112 may assign two counts to a shared portion, while only assigning a single count to a viewed portion. Accordingly, the viral video portion manager 112 can generate a virality score (e.g., whether weighted or not) for each portion of a digital video based on all the social networking activity associated with each portion of the digital video. As such, the viral video portion manager 112 can take into account, for example, likes, shares, comments, and views related to each portion of a digital video when determining which portion(s) of the video are viral. In particular, the viral video portion manager 112 can associate each portion-specific social networking activity with the corresponding portion of a digital video instead of with the digital video as a whole, and adjust a virality score(s) of the corresponding portion and/or overlapping portions accordingly.

In addition to identifying one or more viral portions of a particular video, the viral video portion manager 112 can also collect demographic information associated with users who like or share viral portions of a particular video. As mentioned above, the video manager 106 can identify and provide demographic information related to viral portions of digital videos to various third parties (e.g., advertisers, researchers, media producers). Accordingly, in order to identify demographic information related to social networking users who like or share viral portions of a particular video, the viral video portion manager 112 can determine whether a portion of a video that a particular user is liking or sharing is of interest. Then, the viral video portion manager 112 can utilize the user's unique identifier to access, in accordance with the user's privacy settings, the user's profile and other associated information.

The viral video portion manager 112 can also collect demographic information during the determination as to whether a particular video includes a portion that has become viral, as described above. For example, the viral video portion manager 112 can collect demographic information (e.g., based on the user's unique identifiers listed in the video file layers), for each identified starting timestamp that causes the counter to increase by one. The viral video portion manager 112 can later stop collecting demographic information when the counter begins to decrease. The collected demographic information can be utilized by the social networking system 104 at a later time in order to provide digital video owners, advertisers, etc. with information about the social networking system users who are most interested in and contributed to the virality of the particular digital video.

As mentioned above, and as illustrated in FIG. 1, the video manager 106 also includes a social networking system communication manager 114. In one or more embodiments, the social networking system communication manager 114 manages all communications between the social networking system 104 and one or more social networking system users, as well as all communications between social networking system users. For example, in response to a social networking system user selecting and liking a portion of a particular digital video, the social networking system communication manager 114 can generate a social networking system post associated with the portion of the particular video (e.g., based on the video file layer generated as a result of the user selecting the portion of the particular video), and add the generated post to the newsfeeds of the user's social networking system friends.

Furthermore, the social networking system communication manager 114 can provide, as part of the generated post associated with the portion of the particular video, a video application. In one or more embodiments, the video application is a small application (e.g., including an Applet, Javascript, Flash player, Quicktime player, Windows® Media player, etc.) that enables a user to playback a digital video. For example, the video application can enable the user to playback a digital video in a video preview window within a newsfeed. Additionally, the video application can also enable the user to activate a full-screen mode, wherein the user can playback the digital video in a full-sized window that takes up all of a computing device's display.

In one or more embodiments, the social networking system communication manager 114 can also configure the video application based on a video file layer. As described above, in response to a user selecting a portion of digital video and liking and/or sharing that portion, the video layer manager 110 generates a corresponding video file layer that includes a starting timestamp for the portion, an ending timestamp for the portion, a unique identifier associated with the video, and a unique identifier associated with the user. Thus, in response to the user liking and/or sharing a selected portion of a digital video, the social networking system communication manager 114 can configure the video application based on the video file layer associated with the selected portion, and provide a post including the configured video application on the newsfeeds of one or more of the user's social networking system friends. In at least one embodiment, configuring the video application based on the video file layer includes loading the digital video (e.g., based on the video's unique identifier listed in the video file layer) into the video application, and setting the video application to play (e.g., auto-play or in response to user input starting the video portion) the selected portion of the video (e.g., based on the starting and ending timestamps listed in the video file layer).

Furthermore, as mentioned above, and as illustrated in FIG. 1, the video manager 106 also includes a data storage 116. As shown, the data storage 116 includes social networking system activity data 118 and video data 120. In one or more embodiments, the social networking system activity data 118 can include data representative of social networking system activity information, such as described herein. Similarly, in one or more embodiments, the video data 120 can include data representative of video information, such as described herein.

Additionally, in one or more embodiments and as illustrated in FIG. 1, the social networking system 104 may include a social graph 122 for representing and analyzing a plurality of users, actions, and concepts. Node information 124 of the social graph 122 can store node information comprising, for example, nodes for users and nodes for videos. Edge information 126 of the social graph 122 can store edge information comprising relationships between nodes and/or actions occurring within the social networking system 104. Further detail regarding the social networking system 104, social graphs, edges, and nodes is presented below with respect to FIGS. 8 and 9.

Figure 2:
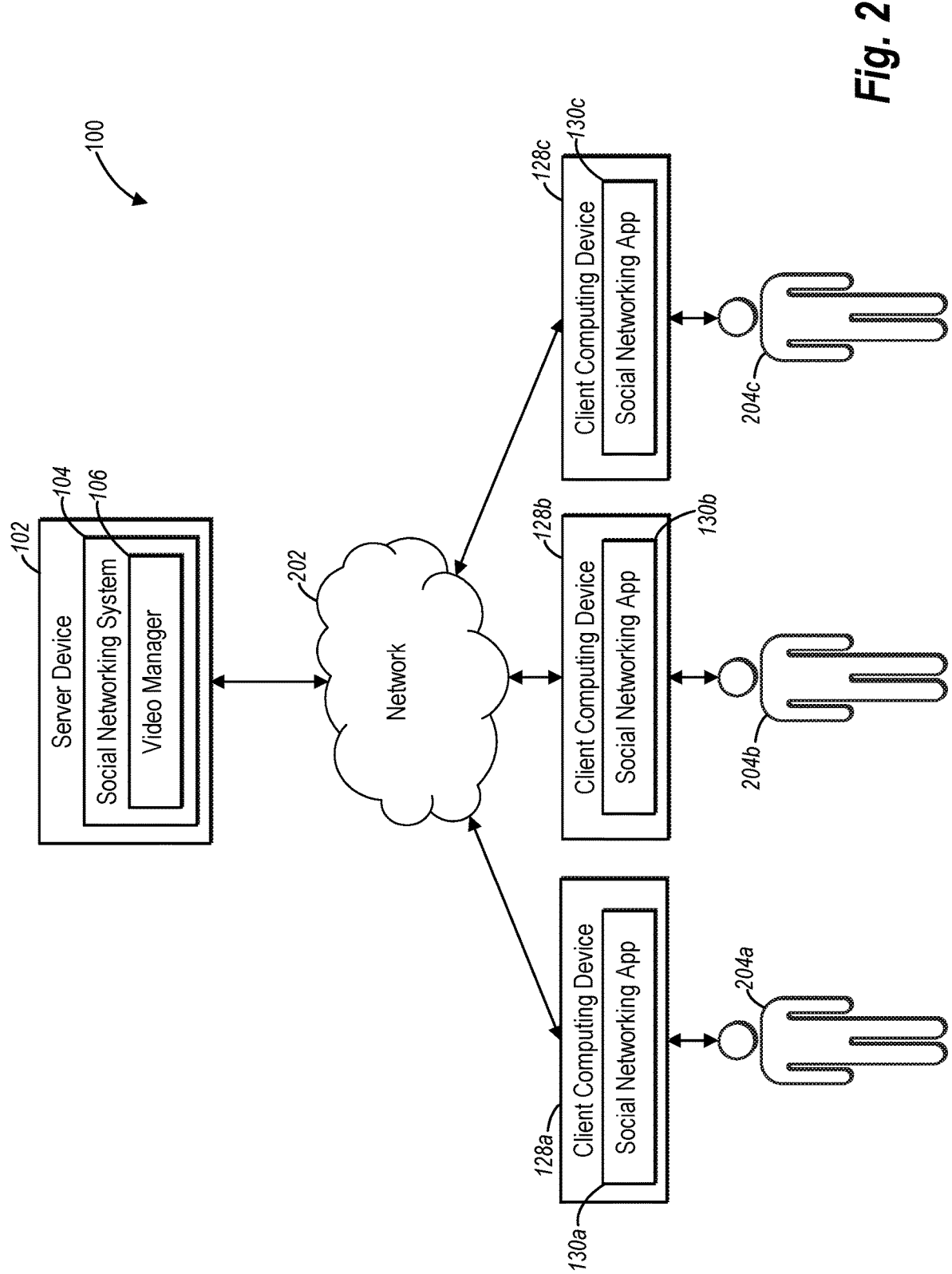
FIG. 2 illustrates a block diagram of an environment for implementing the video management system of FIG. 1 in accordance with one or more embodiments.

FIG. 2 illustrates a schematic diagram of an example environment and implementation of the video management system 100. As illustrated in FIG. 2, the video management system 100 can be implemented across client computing devices 128*a*, 128*b*, and 128*c* each running the social networking applications 130*a*, 130*b*, and 130*c* respectively, as well as the server device 102 housing the social networking system 104, and in turn, the video manager 106. Also as illustrated in FIG. 2, the users 204*a*, 204*b*, 204*c* may interact with the client computing devices 128*a*, 128*b*, and 128*c* respectively in order to access content and/or services on the social networking system 104. Each of the client computing devices 128*a*, 128*b*, and 128*c* may access the social networking system 104 via the social networking applications 130*a*, 130*b*, and 130*c*, as described above.

The client computing devices 128*a*, 128*b*, and 128*c* and the social networking system 104 can communicate via the network 202, which may include one or more networks and may use one or more communication platforms or technologies suitable for transmitting data and/or communication signals. In one or more embodiments, the network 202 may include the Internet or World Wide Web. The network 202, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Although FIG. 2 illustrates a particular arrangement of client computing devices 128*a*, 128*b*, and 128*c*, the social networking system 104, the server device 102, and the network 202, various additional arrangements are possible. For example, the client computing devices 128*a*, 128*b*, and 128*c* may directly communicate with the social networking system 104, bypassing the network 202. Additional details relating to the network 202 are explained below with reference to FIG. 8.

As illustrated in FIG. 2, the users 204*a*, 204*b*, and 204*c* can use the video management system 100 to play digital videos, select portions of digital videos, and share, like, and/or comment on digital videos and/or portions of digital videos. The users 204*a*, 204*b*, and 204*c* may be individuals (i.e., human users), businesses, groups, or other entities. Although FIG. 2 illustrates three users 204*a*, 204*b*, and 204*c*, it is understood that the video management system 100 can allow a plurality of additional users to exchange communications and transactions via a corresponding additional client computing devices.

With reference to the video management system 100 described herein, any of the users 204*a*, 204*b*, or 204*c* can be a sender/creator of a post or electronic content to be shared via the social networking system 104, and any of the users 204*a*, 204*b*, or 204*c* can be a recipient of a post or other electronic content shared via the social networking system 104. In certain embodiments, the social networking system 104 can ensure the users 204*a*, 204*b*, 204*c* are "friends" via the social networking system 104 before they can send and receive posts or electronic messages among each other. Further, the social networking system 104 can share content from users 204*a*, 204*b*, 204*c* in accordance with privacy settings set by each of users 204*a*, 204*b*, 204*c*. In additional or alternative embodiments, the social networking system 104 may simply ensure that users sending and receiving communications merely be active users of the social networking system 104.

The client computing devices 128*a*, 128*b*, and 128*c* may include various types of computing devices. For example, the client computing devices 128*a*, 128*b*, and 128*c* can include a mobile device such as a mobile telephone, a smartphone, a personal digital assistant, a table, a laptop, a smart wearable, or a non-mobile device such as a desktop, a server, and/or another type of computing device. Further, the client computing devices 128*a*, 128*b*, and 128*c* may run dedicated social networking applications (e.g., such as the social networking applications 130*a*, 130*b*, and 130*c*, as described above in relation to FIG. 1) associated with the social networking system 104 to access social networking content (e.g., posts, messages, digital media, etc.) associated with the video management system 100. Additional details with respect to the client computing devices 128*a*, 128*b*, and 128*c* and the social networking system 104 are discussed below with respect to FIGS. 7 and 8.

As will be described in more detail below, the components of the video management system 100 as described with regard to FIGS. 1 and 2 can provide, along and/or in combination with other components, one or more graphical user interfaces ("GUIs"). In particular, the components can allow a user to interact with a collection of display elements for a variety of purposes. Specifically, FIGS. 3A-4B and the description that follows illustrate various example embodiments of the GUIs and features that are in accordance with general principles as described above.

Figure 3A:
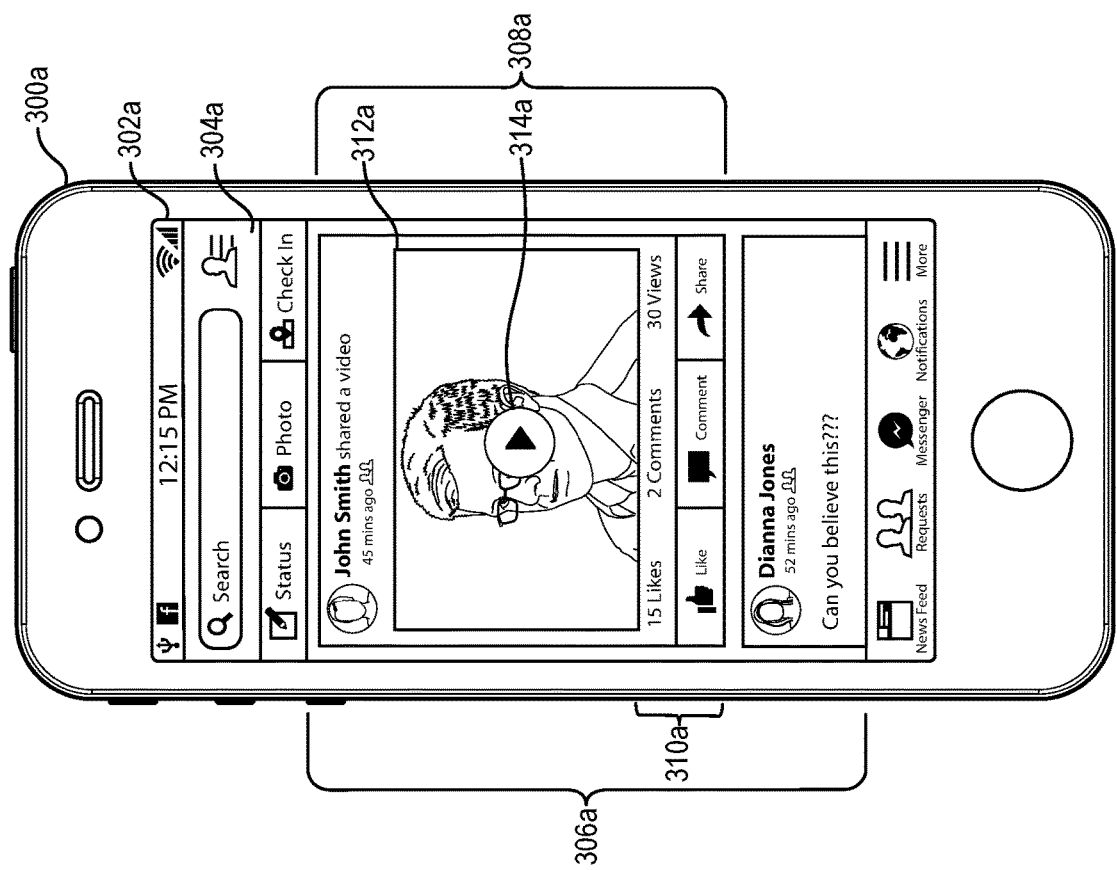
FIGS. 3A-3F illustrate a series of user interfaces in connection with the video management system that show the process by which a user selects and shares a portion of a digital video in accordance with one or more embodiments.

For example, FIGS. 3A-3F illustrate various views of GUIs provided at one of the client computing devices 128*a*, 128*b*, and 128*c* by way of the social networking application 130*a*, 130*b*, and 130*c*, respectively. As mentioned above, in some embodiments, a client computing device (i.e., the client computing device 128*a*, 128*b*, and 128*c*) can implement and/or provide features from the video management system 100. For example, FIG. 3A illustrates a client computing device 300*a* of a social networking system user (e.g., one of the users 204*a*, 204*b*, and 204*c*) that may implement one or more of the components or features of the video manager 106. As shown, the client computing device 300*a* is a handheld device, such as a mobile phone device (e.g., a smartphone). In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 3A, the client computing device 300*a* includes a touch screen display 302*a* that can display a user interface and by way of which user input may be received and/or detected. In particular, the client computing device 300*a* can be a touch screen device. In one or more embodiments, a touch screen device may be the client computing device 128*a*, 128*b*, or 128*c* with at least one surface upon which a user may perform touch gestures (e.g., a laptop, a tablet computer, a personal digital assistant, a media player, a mobile phone, etc.). Additionally or alternatively, the client computing device 300 may include any other suitable input device, such as a touch pad or those described below in reference to FIG. 7.

In FIG. 3A, the touch screen display 302*a* of the client computing device 300*a* displays a social networking system GUI 304*a* provided by the GUI manager 132 of the social networking application 130 installed thereon. In one or more embodiments, the GUI manager 132 provides the social networking system GUI 304*a* in order to provide a display of a newsfeed 306 of the user of the client computing device 300a. As shown, the newsfeed 306 includes various posts including post 308a.

As described above, a post within a newsfeed can include various types of data or content including, but not limited to, text, applications, media, etc. As shown in FIG. 3A, the post 308a includes information identifying a social networking friend who created the post, an embedded video preview window 312a, and social networking system activity controls 310a. As described above, the video application allows a user to interact with a particular video by providing a preview window and/or a full-screen video GUI. In one or more embodiments, the embedded video preview window 312a functions in connection with a video file layer that includes information identifying a particular digital video. The embedded video preview window 312a can pre-load the particular digital video identified by the video file layer. In at least one embodiment, the embedded video preview window 312a can also cause the particular digital video to auto-play within the newsfeed 306a as soon as the user of the client computing device 300a scrolls the newsfeed 306a to a point where the post 308a is visible.

As mentioned, the post 308a also includes social networking system activity controls 310a. In one or more embodiments, the social networking system 104 provides the social networking system activity controls 310a as part of a post to allow social networking system users to engage with the post. For example, by selecting a "like" control, a user is effectively expressing interest in or support for a particular post. Similarly, by selecting the "comment" control, a user can add a comment to a particular post. Finally, by selecting the "share" control, a user can share a particular post authored by another user with additional users. The social networking system activity controls 310a also include various indicators of how many social networking system users have liked, commented on, viewed, and/or shared the post 308a. In additional or alternative embodiments, the social networking system activity controls 310a may include additional controls besides those shown in FIG. 3A.

As mentioned above, the video preview window 312a embedded in the post 308a may auto-play (with or without sound) a particular digital video. In additional or alternative embodiments, the video preview window 312a may only display a still photograph (e.g., a frame) from the particular digital video within the post 308a. Regardless of what the video display window 312a shows within the post 308a, the user of the client computing device 300a may want to view the digital video associated with video preview window 312a in full-screen mode. In other words, rather than watching the digital video within the embedded video window in the post 308a, the user of the client computing device 300a may wish to view the video in a display that takes up more or the entirety of the touch screen display 302a. In that case, the video preview window 312a may include a video activation control 314a that, when selected, causes the video application to transition the video preview window 312a to a full screen mode.

Figure 3B:
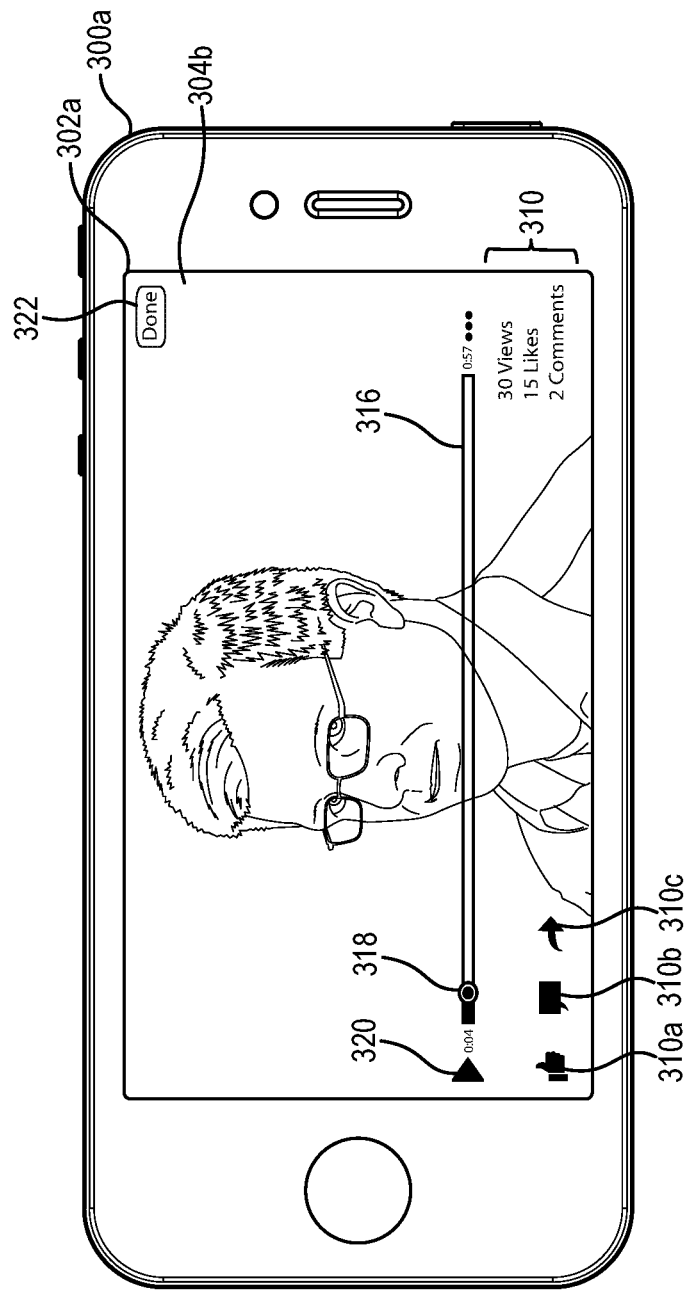

For example, as shown in FIG. 3B, the video application can provide a full screen video GUI 304b on the touch screen display 302a of the client computing device 300a. In one or more embodiments, the full screen video GUI 304b takes up all of the touch screen display 302a, and allows the user of the client computing device 300a to view a particular video in as large a format as possible. Depending on the screen ratio of the particular digital video associated with the video application, the video application can fill any unused space within the touch screen display 302a with black.

The full screen video GUI 304b can also include various controls that allow the user of the client computing device 300a to interact with the particular video. For example, as shown in FIG. 3B, the full screen video GUI 304b can include a playback timeline 316 along with a playback indicator 318, and a playback control 320. In one or more embodiments, the playback timeline 316 and the playback indicator 318 work in connection to illustrate the current point or timestamp in the particular video that is being watched by the user of the client computing device 300a. In at least one embodiment, the user of the client computing device 300a can slide the playback indicator 318 along the playback timeline 316 to play the particular digital video from a specific point. Additionally, in one or more embodiments, the playback control 320 allows the user of the client computing device 300a to start and/or pause playback of the particular video within the full screen video GUI 304b.

The full screen video GUI 304b also include the social networking system activity controls 310. As shown in FIG. 3B, the social networking system activity controls 310 include a like control 310a, a comment control 310b, and a share control 310c (e.g., as described with reference to FIG. 3A), along with the indicators as to how many social networking system users have liked, commented on, viewed, and/or shared the particular video being shown within the full screen video GUI 304b. When the user of the client computing device 300a wishes to exit the full screen video GUI 304b and return to the social networking system GUI 304a, the user can select the "done" button 322.

Figure 3C:
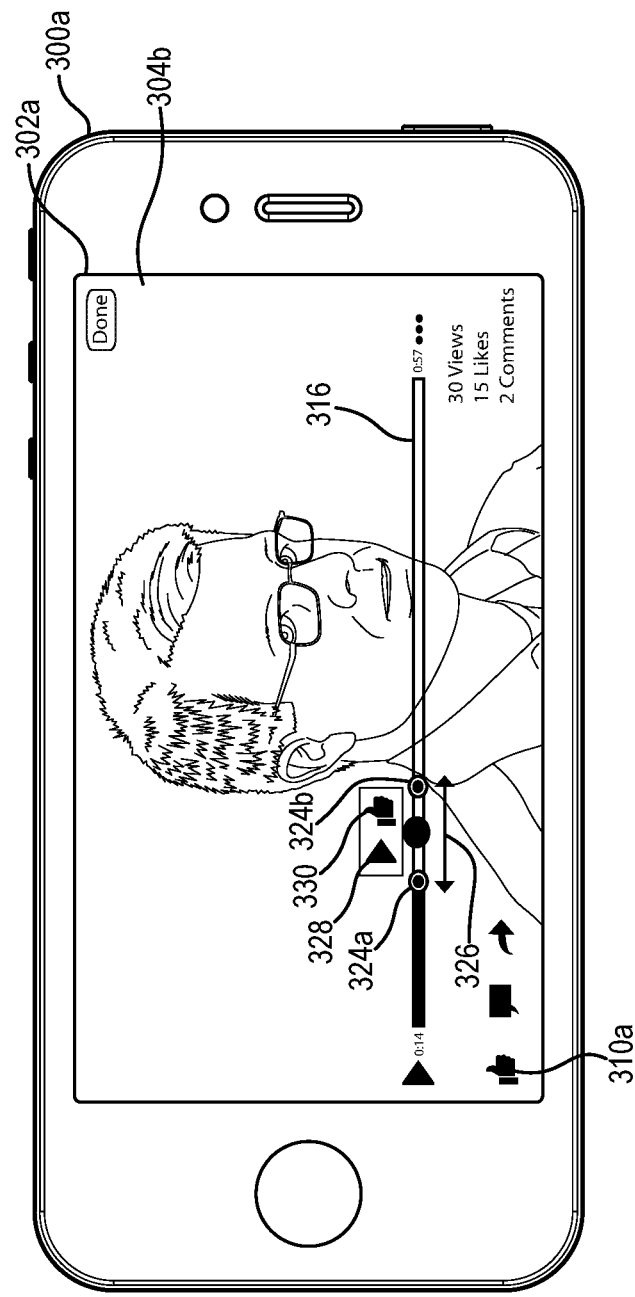

As discussed above, the video management system 100 enables a user to select a portion of a digital video to like, comment on, and/or share with additional social networking system users. In one or more embodiments, the user can select a portion of a digital video via the full screen video GUI 304b. For example, in at least one embodiment and in response to a selection of the like control 310a, the social networking application 130 can provide a starting timeline handle 324a and an ending timeline handle 324b, as shown in FIG. 3C. For instance, as mentioned above, the user input detector 134 can detect different types of inputs. Accordingly, the social networking application 130 can provide the starting timeline handle 324a and the ending timeline handle 324b in response to a press-and-hold touch gesture detected by the user input detector 134 in connection with the like control 310a. Alternatively, if the user of the client computing device 300a wants to "like" the entire video, the user can simply tap the like control 310a, rather than press-and-hold the like control 310a. In additional or alternative embodiments, the social networking application 130 can provide the starting timeline handle 324a and the ending timeline handle 324b in response to a double mouse click, a double tap gesture, via a dedicated control, or by any other means. Furthermore, the social networking application 130 can provide extra sets of starting and ending timeline handles in response to repeated selections of the like control 310a, such that the user of the client computing device 300a can select additional portions of the digital video.

In additional embodiments, the social networking application 130 can provide the starting timeline handle 324a and the ending timeline handle 324b in response to a press-and-hold touch gesture detected by the user input detector 134 in connection with the comment control 310b. In that case, after the user selects the portion of interest within the digital video using the starting timeline handle 324a and the ending timeline handle 324b, the social networking application 130 can provide a text input area in which the user can compose a comment. In response to the user submitting the comment, the social networking system 104 can associate the comment with the selected portion of the digital video, and/or make the selected portion and/or the comment visible to other users via the social networking system 104.

Similarly, the social networking application 130 can provide the starting timeline handle 324a and the ending timeline handle 324b in response to a press-and-hold touch gesture detected by the user input detector 134 in connection with the share control 310c. In that case, after the user selects the portion of interest within the digital video using the starting timeline handle 324a and the ending timeline handle 324b, the social networking application 130 can instantly generate, and add to the newsfeeds of the user's social networking friends, a post including the selected portion of the digital video.

The starting timeline handle 324a and the ending timeline handle 324b enable the user of the client computing device 300a to select the starting and ending points of the portion of the digital video that the user wishes to like and/or share. For example, as indicated by the arrow 326 in FIG. 3C, the user of the client computing device 300a can slide the starting timeline handle 324a and the ending timeline handle 324b along the playback timeline 316 as a unit (e.g., by selecting and dragging a point in between the starting timeline handle 324a and the ending timeline handle 324b). Alternately or additionally, the user can slide the starting timeline handle 324a and the ending timeline handle 324b to points along the playback timeline 316 independently (e.g., as illustrated by the arrows 332a and 332b in FIG. 3D).

In order to assist the user of the client computing device 300a in selecting a portion of a particular digital video, the social networking application 130 can also provide a way for the user to preview the selected portion of the digital video. For example, as shown in FIG. 3C, the social networking application 130 can provide the portion preview control 328. In one or more embodiments, in response to the user selecting the portion preview control 328 the social networking application 130 can playback only the portion of the digital video that starts at a timestamp indicated by the starting timeline handle 324a and ends at a timestamp indicated by the ending timeline handle 324b. The social networking application 130 can provide the portion playback within the full screen video GUI 304b, or alternatively can provide a new GUI for the portion playback. Furthermore, as a user drags the starting timeline handle 324a or the ending timeline handle 324b, the social networking application 130 can present (e.g., within the full screen video GUI 304b) a still frame of the video that corresponds to the position of the starting timeline handle 324a or the ending timeline handle 324b.

Figure 3D:
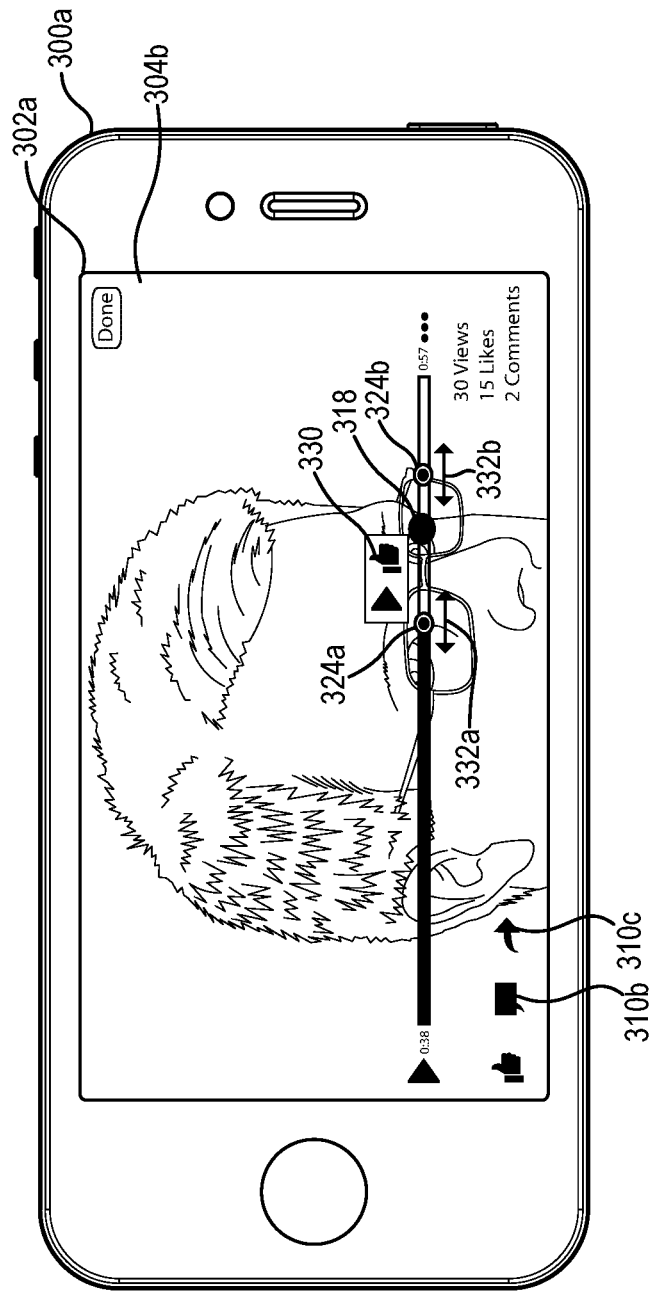

Furthermore, once the user of the client computing device 300a has indicated the portion of the digital video that is of interest, the user can like only the portion of the digital video, rather than liking the entire digital video. For example, as shown in FIGS. 3C and 3D, the user can like only the portion of the digital video indicated by the starting timeline handle 324a and the ending timeline handle 324b by selecting the portion like control 330. Depending on the user's privacy settings within the social networking system 104, the social networking system 104 may provide a notification to other social networking system users in response to the user of the client computing device 300a liking the portion of the digital video via the portion like control 330 or the like control 310a.

Figure 3E:
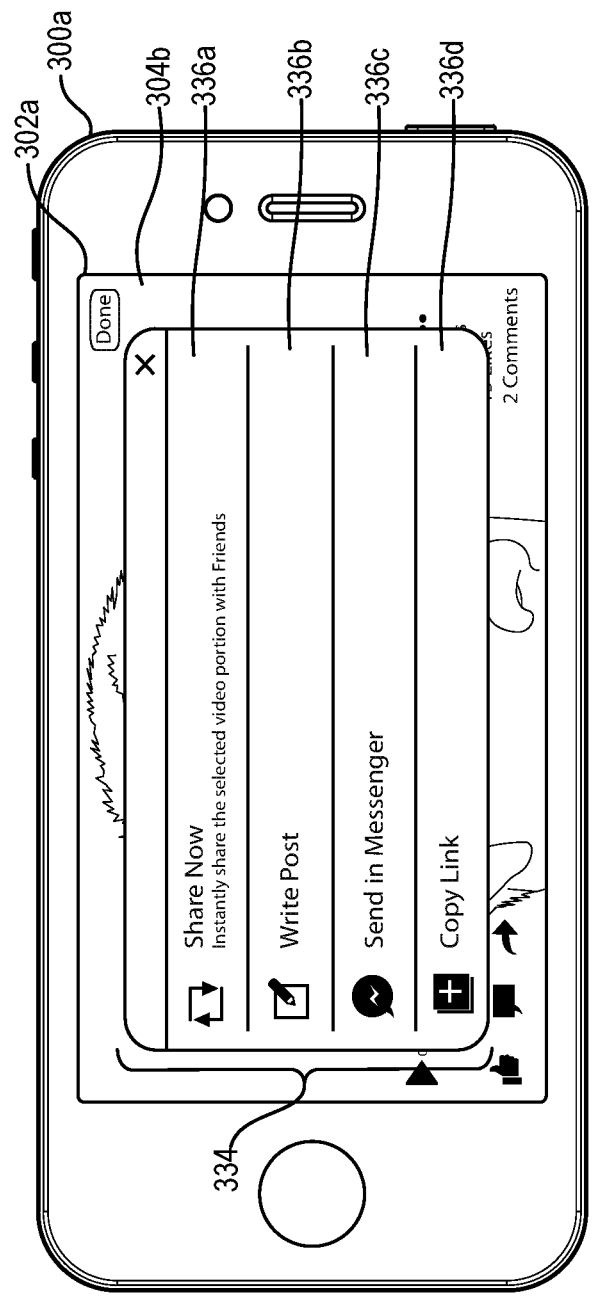

Alternatively, or in addition to liking the selected portion of the video, once the user of the client computing device 300a has indicated the portion of the digital video that is of interest, the user can share the selected portion by selecting the comment control 310b. For example, as shown in FIG. 3E and in response to the user selecting the comment control 310b, the social networking application 130 provides an activity control list 334 within the touch screen display 302a of the client computing device 300a. In one or more embodiments, the activity control list 334 includes activity controls 336a-336d. In at least one embodiment, the user of the client computing device 300a can instantly share only the selected portion of the digital video with additional social networking system users by selecting the activity control 336a.

Furthermore, in at least one embodiment and in response to the user selecting the activity control 336b, the video manager 106 can enable the user to compose a post directed at either the full digital video or only at the selected portion of the digital video. Similarly, in response to the user selecting the activity control 336c, the video manager 106 can enable the user to send either the full digital video or the selected portion of the digital video as part of an electronic message. Finally, in response to the user selecting the activity control 336d, the video manager 106 can provide the user with a hyperlink that the user can copy into other applications that is directed to either the full digital video or the selected portion of the digital video.

Regardless of the action selected by the user after selecting a particular portion of the digital video, the video manager 106 generates a video file layer associated with the selected portion of the digital video. For example, in response to the user selecting the portion like control (e.g., as shown in FIG. 3D) and in addition to providing the selected portion to one or more friends of the user, the video manager 106 generates a video file layer associated with the selected portion. In one or more embodiments, the video manager 106 includes within the generated video file layer a starting timestamp indicated by the starting timeline handle 324a, an ending timestamp indicated by the ending timeline handle 324a, a unique identifier associated with the digital video, and a unique identifier associated with the user who selected the portion of the digital video. Also as described above, the video manager 106 can store the generated video file layer based on the unique identifier associated with the digital video or based on the unique identifier associated with the user.

Figure 3F:
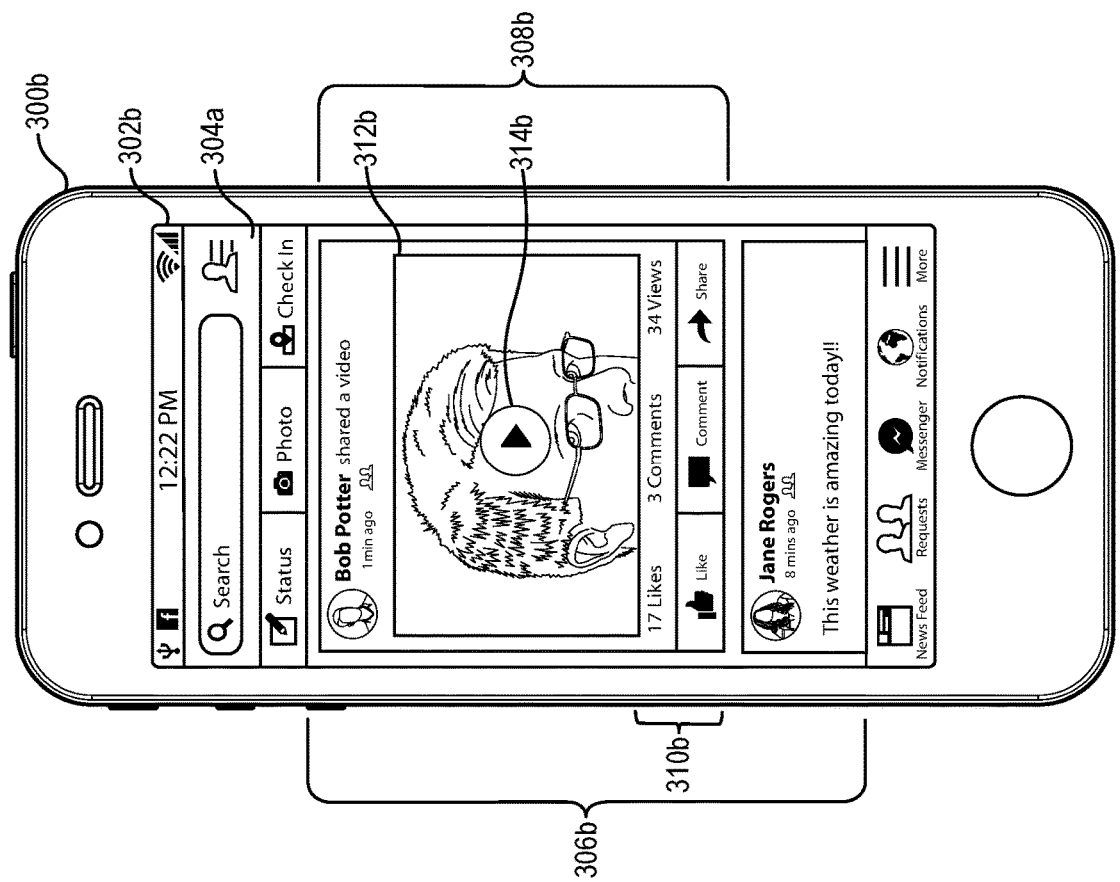

In one or more embodiments, in response to the user of the client computing device 300a selecting the activity control 336a, the social networking system 104 can share the selected portion of the digital video with additional social networking system users. For example, as shown in FIG. 3F, the video manager 106 can generate a post 308b including a video preview window 312b and add the generated post 308b to the newsfeed 306b displayed within the social networking system GUI 304a on the touch screen display 302b of a client computing device 300b of a social networking system friend of the user who selected the portion of the digital video (e.g., the user of the client computing device 300a). As mentioned above, the video manager 106 can configure the video preview window 312b based on the video file layer generated when the portion of the digital video was selected. Accordingly, in one or more embodiments, the video preview window 312b can auto-play the selected portion of the digital video starting at the starting timestamp and ending at the ending timestamp as indicated by the associated video file layer. In additional or alternative embodiments, the generated post 308b may include additional controls (e.g., in addition to the controls 310b) for use in association with the video preview window. For example, in one embodiment, the generated post 308b may include a share control, a like control, and/or a comment control specifically directed to the selected portion of the digital video within the video preview window 312b. Alternatively, the generated post 308b may include the existing share/like/comment controls in different locations.

In one or more embodiments, the user of the client computing device 300b can utilize the social networking system activity controls 310b to like, comment on, or share the digital video. In at least one embodiment, the video manager 106 may take utilizing the social networking system activity controls 310b as shown in FIG. 3F to mean the user of the client computing device 300b is liking, commenting on, or sharing only the selected portion of the digital video, as indicated by the associated video file layer. In alternative embodiments, the video manager 106 may take utilizing the social networking system activity controls 310b to mean the user of the client computing device 300b is liking, commenting on, or sharing the entire digital video indicated by the associated video file layer. In that case, the user of the client computing device 300b can like, comment on, or share only the selected portion of the digital video by opening the digital video in the full screen video GUI, as described above. In one or more embodiments, when the user opens the digital video in the full screen video GUI, the video manager 106 can provide an indicator within the playback timeline 316 that shows the portion of the digital video selected by the user of the client computing device 300a (e.g., "Bob Potter").

As discussed above, the video manager 106 can also identify viral portions of digital videos that are shared by users of the social networking system 104. For example, when a threshold number of social networking system users like and/or share the same particular portion of a digital video, that portion becomes viral. Accordingly, the video manager 106 can track the portions of digital videos that are shared and liked by social networking system users in order to determine whether a particular digital video portion has "gone viral." In one or more embodiments, in response to identifying a viral portion of a particular digital video, the video manager 106 can provide an indication within the digital video as to where the viral portion is located within the digital video.

Figure 4A:
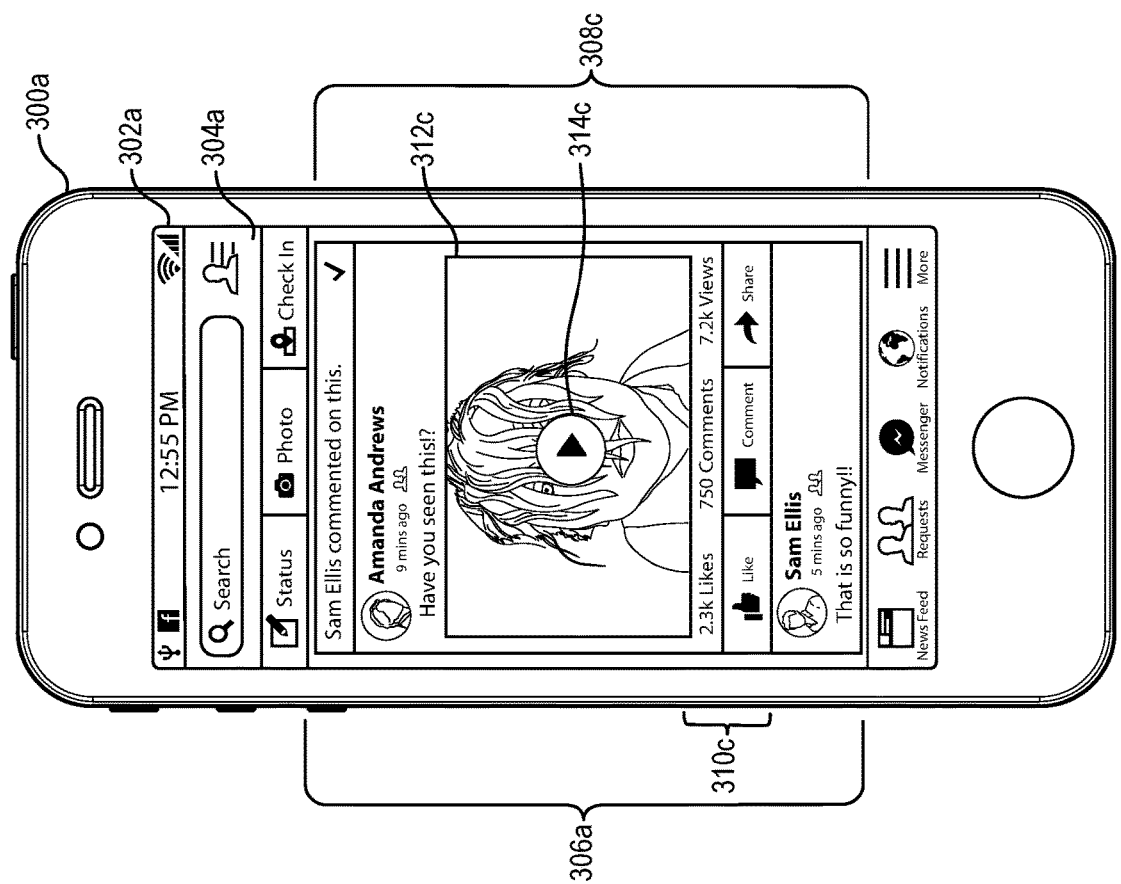
FIGS. 4A-4B illustrate a series of user interfaces in connection with the video management system that show the process by which a viral portion of a digital video is indicated in accordance with one or more embodiments.

To illustrate, FIG. 4A shows the social networking system GUI 304a on the touch screen display 302a of the client computing device 300a. As described above with reference to FIG. 3A, the social networking system GUI 304a includes a newsfeed 306a of the user of the client computing device 300a and shows a post 308c. In one or more embodiments, the post 308c includes an embedded video preview window 312c associated with a particular digital video and has been shared, re-shared, commented on, and viewed by many social networking system users (e.g., as indicated by the information included in the social networking system activity controls 310c).

Also as described above, the digital video associated with the embedded video preview window 312c may include one or more viral portions. In one or more embodiments, the video manager 106 identifies viral portions of widely shared digital videos by identifying video file layers and/or corresponding social networking activity associated with a widely shared digital video (e.g., where the video file layers are created and/or modified in response to and for the purpose of tracking a user liking, sharing, commenting on, or viewing a particular portion of the digital video where the particular portion is indicated by a starting timestamp and an ending timestamp), weighting the social networking activity associated with each video file layer (e.g., based on the types of social networking activity associated with each video portion), and determining virality scores for each segment (e.g., for each timestamp, each second interval, each 5-second interval, or each 10-second interval) of the video to identify the virality thereof. In response to the user of the client computing device 300a selecting the video activation control 314c in the embedded video preview window 312c, the social networking application 130 can provide the full screen video GUI 304b on the touch screen display 302a of the client computing device 300a, as shown in FIG. 4B.

Figure 4B:
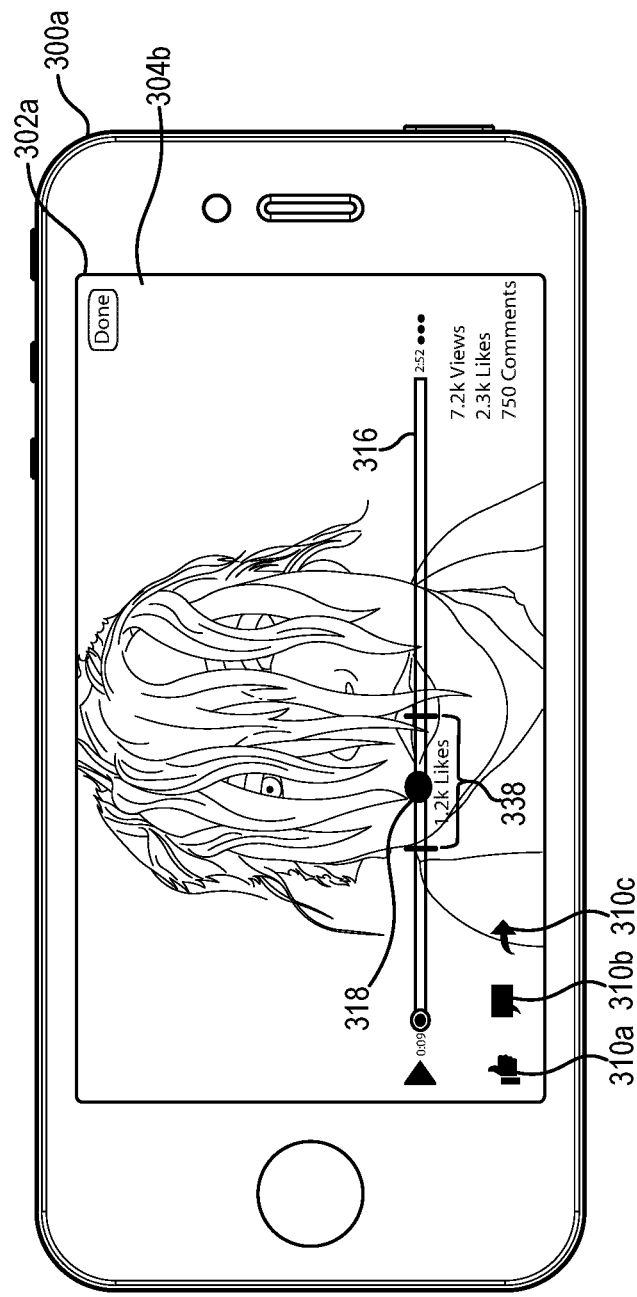

As illustrated in FIG. 4B, the social networking application 130 can provide the digital video associated with the embedded video preview window 312 (e.g., as shown in FIG. 4A) in the full screen video GUI 304b. In one or more embodiments, in response to the video manager 106 identifying one or more viral portions of the digital video, the social networking application 130 can also provide a viral portion indicator 338 within the playback timeline 316. For example, the viral portion indicator 338 indicates the starting and ending points of a viral portion of the digital video that has been liked and/or shared by a threshold number of social networking system users. The viral portion indicator 338 can include a number of how many likes, shares, comments, and/or views the viral portion of the digital video has garnered (e.g., "1.2 k Likes").

In additional or alternative embodiments, the viral portion indicator 338 can include different colors, icons, etc. within the playback timeline 316 to draw a user's attention to the viral portion of the video. For example, the viral portion indicator 338 can be a highlighted section of the playback timeline 316. Alternatively, if a particular digital video includes more than one viral portion, the viral portion indicators may be a color coding of the playback timeline 316 to indicate how viral a particular portion is based on the calculated and weighted virality scores/counts, as described above (e.g., a less viral portion corresponds to a section of the playback timeline 316 that is colored yellow, while a more viral portion corresponds to a section of the playback timeline 316 that is colored red). Additionally or alternative, the playback timeline 316 may be arbitrarily broken into predefined segments (e.g., at 1 second intervals, 5 second intervals, etc.) and each predefined segment may be color coded to indicate a virality of that particular segment.

In one or more embodiments, the user of the client computing device 300a can like or share only the viral portion of the digital video identified the viral portion indicator 338 (e.g., by selecting the viral portion within the playback timeline 316 and then selecting a corresponding activity control). Alternatively, the user can like or share the entire digital video or uniquely specify another portion of the digital video to like or share, such as as described above.

FIGS. 1-4B, the corresponding text, and the examples, provide a number of different methods, systems, and devices for sharing one or more portions of a digital video and identifying viral portions of digital videos within a social networking system 104. In addition to the foregoing, embodiments can also be described in terms of flowcharts comprising acts and steps in a method for accomplishing a particular result. For example, FIGS. 5-6 may be performed with less or more steps/acts or the steps/acts may be performed in differing orders. Additionally, the steps/acts described herein may be repeated or performed in parallel with one another or in parallel with different instances of the same or similar steps/acts.

Figure 5:
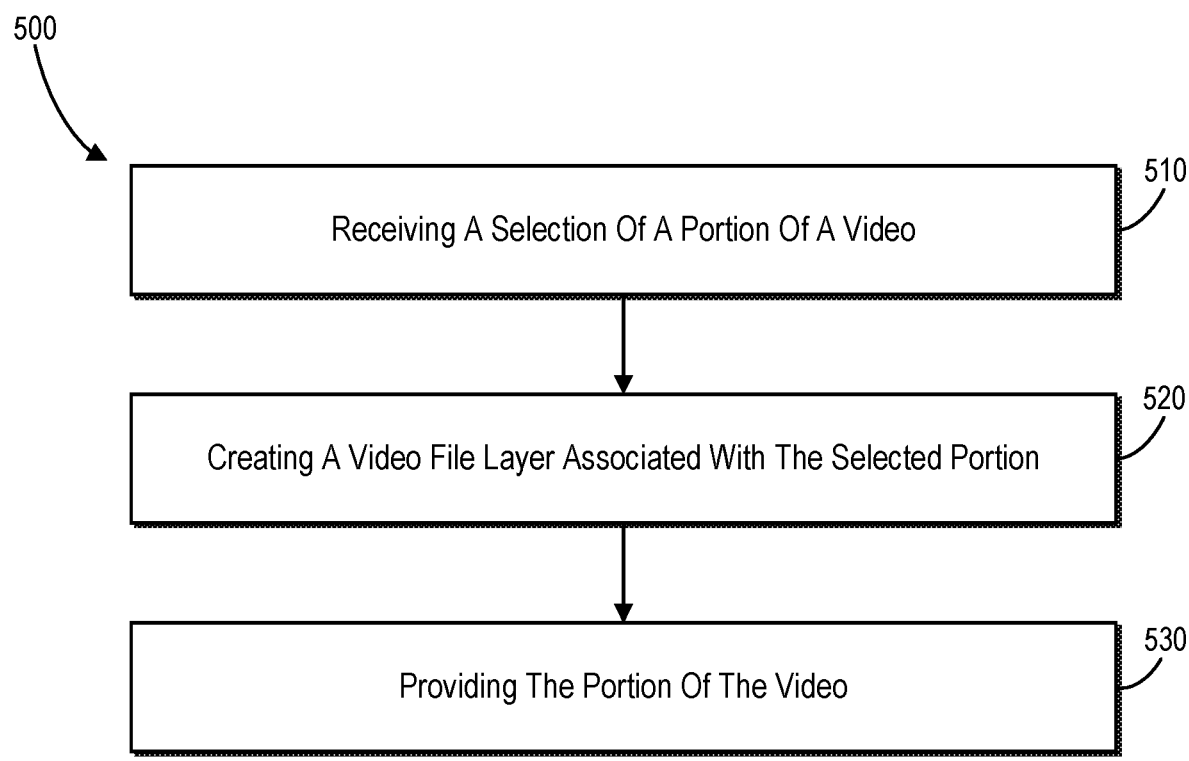
FIG. 5 illustrates a flowchart of a series of acts in a method of selecting and sharing one or more portions of a digital video via a social networking system in accordance with one or more embodiments.

FIG. 5 illustrates a flowchart of one example method 500 of selecting and sharing one or more portions of a digital video within a social networking system. The method 500 includes an act 510 of receiving a selection of a portion of a video. In particular, the act 510 can involve receiving, from a first social networking system user, a selection of a portion of a video viewed by the first social networking system user. In one or more embodiments, the selection of the portion of the video is received via a video application associated with the social networking system, such as described in more detail above.

The method 500 also includes an act 520 of creating a video file layer associated with the selected portion. In particular, the act 520 can involve, in response to receiving the selection of the portion of the video, creating a video file layer including a unique identifier for the first social networking system user, a unique identifier for the video, a starting timestamp indicating the beginning point of the portion of the video, and an ending timestamp indicating the ending point of the portion of the video. In one or more embodiments, the method 500 can further include storing the video file layer based on the unique identifier for the digital video.

The method 500 further includes an act 530 of providing the portion of the video. In particular, the act 530 can involve utilizing the video file layer to provide the portion of the digital video to one or more social networking system users associated with the first social networking system user. In one or more embodiments, utilizing the video file layer to provide the portion of the digital video to one or more social networking system users associated with the first social networking system user comprises providing the portion of the digital video within a video preview window of the video application in a newsfeed associated with each of the one or more social networking system users. For example, in at least one embodiment, utilizing the video file layer to provide the portion of the digital video to one or more social networking system users associated with the first social networking system user can further include auto-playing, based on the starting timestamp and the ending timestamp, the portion of the digital video within the video preview window. Additionally or alternatively, utilizing the video file layer to provide the portion of the digital video to one or more social networking system users associated with the first social networking system user can be in response to the first social networking system user indicating a desire to share the portion of the digital video.

In one or more embodiments, the method 500 includes an act of, in response to receiving the selection of the portion of the digital video, providing a playback control to the first social networking system user. In at least one embodiment, the method 500 also includes receiving from at least one of the one or more social networking system users associated with the first social networking system user a selection to view the digital video. For example, in that case, the method 500 includes providing the digital video to the at least one social networking system user associated with the first social networking system user via a video application, and providing in association with the digital video an indication of the portion of the digital video selected by the first social networking system user.

Figure 6:
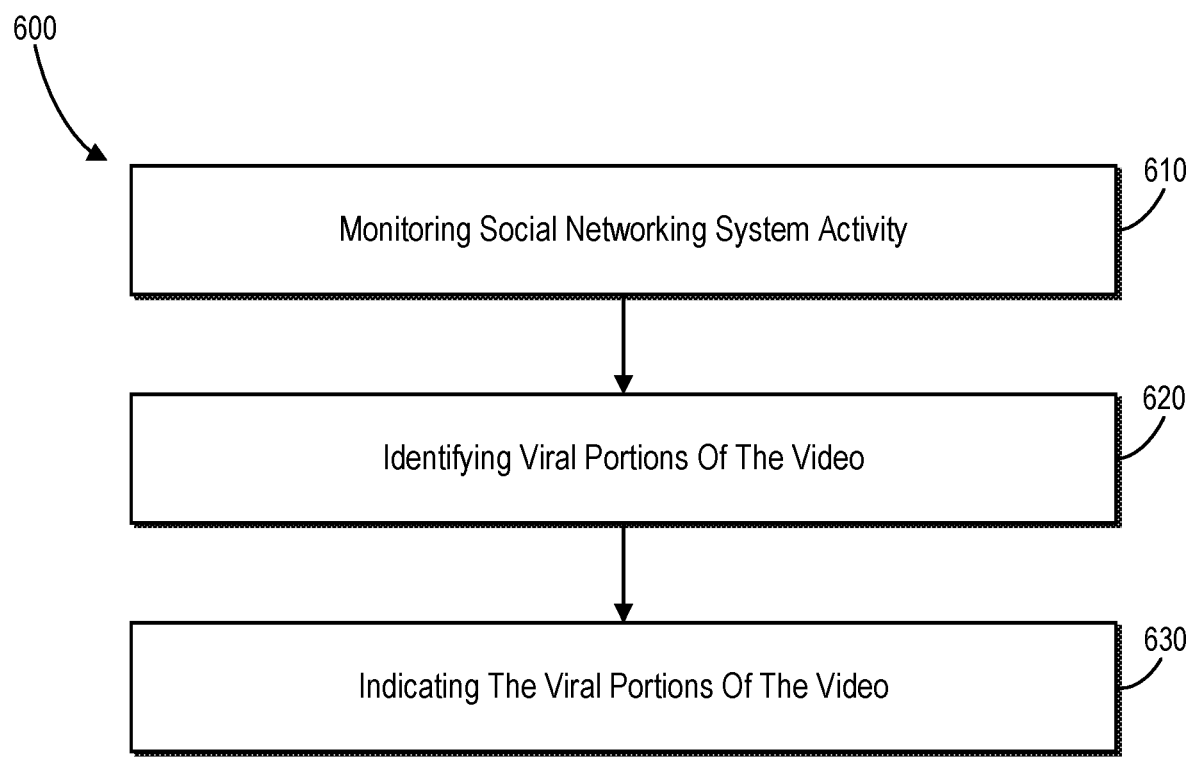
FIG. 6 illustrates a flowchart of a series of acts in a method of identifying one or more viral portions of a digital video via a social networking system in accordance with one or more embodiments.

FIG. 6 illustrates a flowchart of one example method 600 of identifying one or more viral portions of a digital video within a social networking system 104. The method 600 includes an act 610 of monitoring social networking system activity. In particular, the act 610 can involve monitoring social networking system activity associated with a video including monitoring interactions with portions of the video. In one or more embodiments, monitoring interactions with portions of the video includes monitoring one or more of likes associated with portions of the video and shares associated with portions of the video. In at least one embodiment, monitoring social networking system activity associated with the digital video further includes monitoring comments associated with the digital video.

The method 600 also includes an act 620 of identifying viral portions of the video. In particular, the act 620 can involve identifying, based on the monitored social networking system activity, one or more viral portions of the digital video. In one or more embodiments, identifying one or more viral portions of the digital video includes identifying one or more video file layers associated with the digital video, and determining, based on the social networking activity associated each video file layer/portion, that a particular portion of the digital video is a viral portion.

The method 600 further includes an act 630 of indicating the viral portions of the video. In particular the act 630 can involve, in response to identifying one or more viral portions of the digital video, providing, during playback of the digital video to a social networking system user, one or more indicators of the one or more viral portions of the digital video. In one or more embodiments, the method 600 also includes an act of determining that a particular portion of the digital video is a viral portion based on levels of social networking system activity associated with the particular portion of the digital video. For example, providing, during playback of the video to the social networking system user, one or more indicators (e.g., via the viral portion indicator 338) of the one or more viral portions of the digital video includes providing one or more indicators within a video application. Additionally, the act 630 of indicating the viral portion of the digital video can include automatically playing the viral portion of the digital video within a post directed to the digital video included in a social networking system user's newsfeed, as opposed to beginning playback of the digital video from the beginning of the digital video.

Additionally, the method 600 can include an act of identifying, in response to determining one or more viral portions of the digital video, demographic information associated with the one or more social networking system users. For example, identifying demographic information can further include providing the identified demographic information to one or more advertisers. In one or more embodiments, the identified demographic information can include age information, gender information, location information, social networking activity information, and profile information. The identified demographic information can be utilized by a digital video owner, advertisers, etc. in order to identify virality of a portion of the digital video among a specific group or demographic of social networking system users. In some embodiments, this use of demographic information can help advertisers and other specifically target content to desired user groups.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
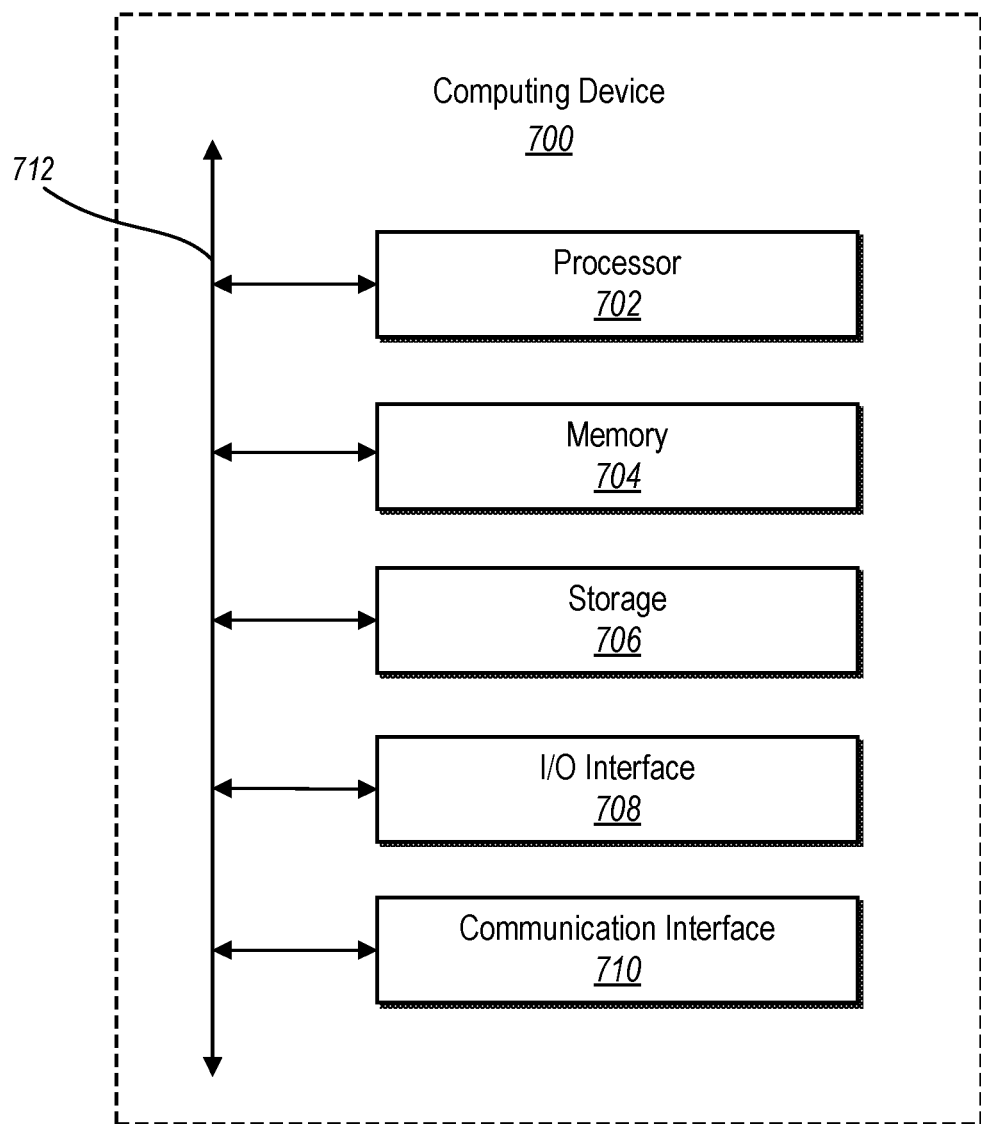
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, video-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 8:
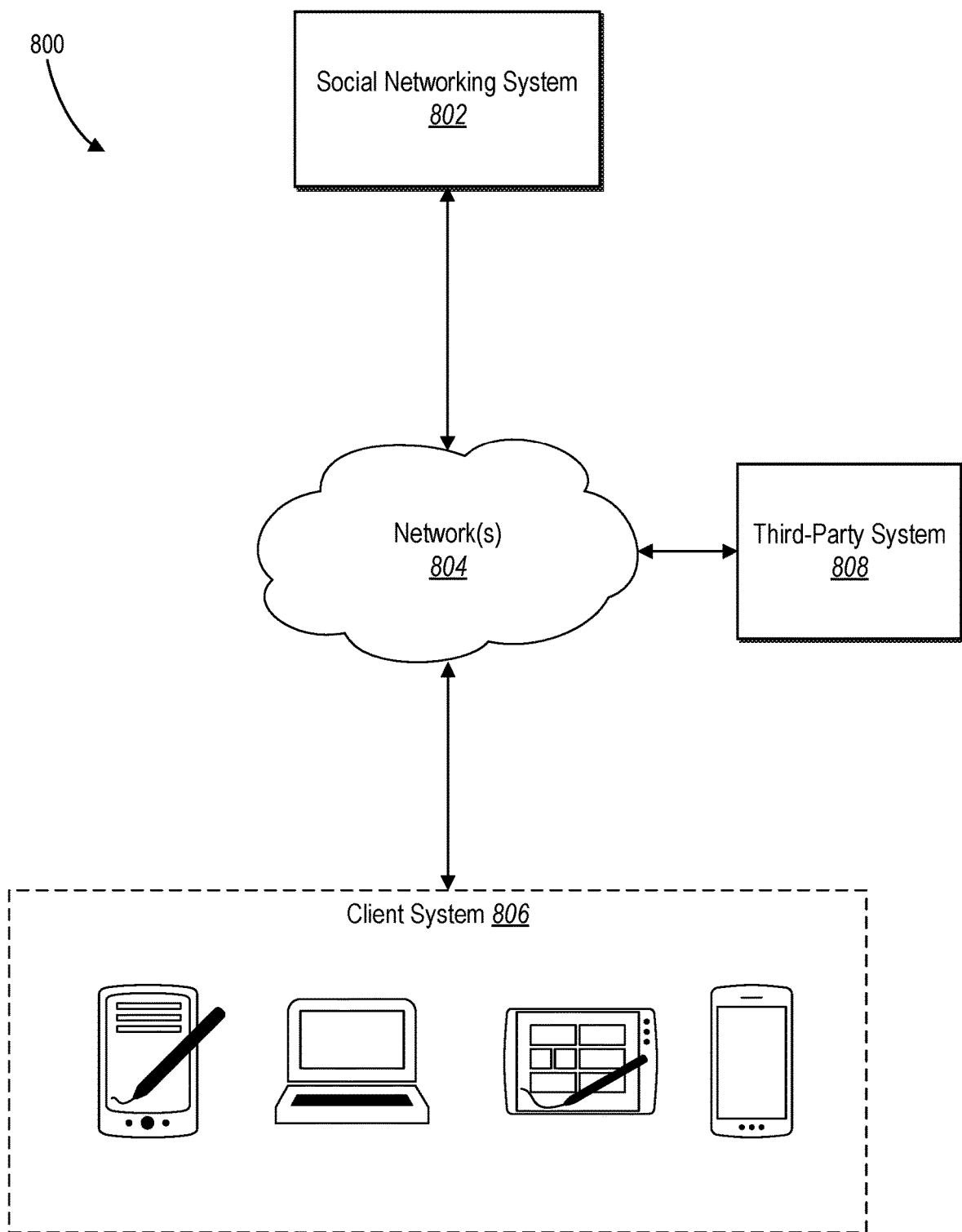
FIG. 8 is an example network environment of a social networking system in accordance with one or more embodiments.

FIG. 8 illustrates an example network environment 800 of a social networking system. Network environment 800 includes a client system 806, a social networking system 802, and a third-party system 808 connected to each other by a network 804. Although FIG. 8 illustrates a particular arrangement of client system 806, social networking system 802, third-party system 808, and network 804, this disclosure contemplates any suitable arrangement of client system 806, social networking system 802, third-party system 808, and network 804. As an example and not by way of limitation, two or more of client system 806, social networking system 802, and third-party system 808 may be connected to each other directly, bypassing network 804. As another example, two or more of client system 806, social networking system 802, and third-party system 808 may be physically or logically co-located with each other in whole or in part. Moreover, although FIG. 8 illustrates a particular number of client systems 806, social networking systems 802, third-party systems 808, and networks 804, this disclosure contemplates any suitable number of client systems 806, social networking systems 802, third-party systems 808, and networks 804. As an example and not by way of limitation, network environment 800 may include multiple client system 806, social networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 806. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 802 may be a network-addressable computing system that can host an online social network. Social networking system 802 may generate, store, receive, and send social-networking data, such as, for example, user-profile data, concept-profile data, social-graph information, or other suitable data related to the online social network. Social networking system 802 may be accessed by the other components of network environment 800 either directly or via network 804. In particular embodiments, social networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social networking system 802, or a third-party system 808 to manage, retrieve, modify, add, or delete, the information stored in data store.

In particular embodiments, social networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 802 may provide users of the online social network the ability to communicate and interact with other users. In particular embodiments, users may join the online social network via social networking system 802 and then add connections (e.g., relationships) to a number of other users of social networking system 802 whom they want to be connected to. Herein, the term "friend" may refer to any other user of social networking system 802 with whom a user has formed a connection, association, or relationship via social networking system 802.

In particular embodiments, social networking system 802 may provide users with the ability to take actions on various types of items or objects, supported by social networking system 802. As an example and not by way of limitation, the items and objects may include groups or social networks to which users of social networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 802 or by an external system of third-party system 808, which is separate from social networking system 802 and coupled to social networking system 802 via a network 804.

In particular embodiments, social networking system 802 may be capable of linking a variety of entities. As an example and not by way of limitation, social networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social networking system 802. In particular embodiments, however, social networking system 802 and third-party systems 808 may operate in conjunction with each other to provide social-networking services to users of social networking system 802 or third-party systems 808. In this sense, social networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 802 also includes user-generated content objects, which may enhance a user's interactions with social networking system 802. User-generated content may include anything a user can add, upload, send, or "post" to social networking system 802. As an example and not by way of limitation, a user communicates posts to social networking system 802 from a client system 806. Posts may include data such as status updates or other textual data, location information, photos, videos, links, music or other similar data or media. Content may also be added to social networking system 802 by a third-party through a "communication channel," such as a newsfeed or stream.

In particular embodiments, social networking system 802 may include a variety of servers, sub-systems, programs, modules, logs, and data stores. In particular embodiments, social networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 802 may also include suitable components such as network interfaces, security mechanisms, load balancers, failover servers, management-and-network-operations consoles, other suitable components, or any suitable combination thereof. In particular embodiments, social networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 802 to one or more client systems 806 or one or more third-party system 808 via network 804. The web server may include a mail server or other messaging functionality for receiving and routing messages between social networking system 802 and one or more client systems 806. An API-request server may allow a third-party system 808 to access information from social networking system 802 by calling one or more APIs. An action logger may be used to receive communications from a web server about a user's actions on or off social networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social networking system 802. A privacy setting of a user determines how particular information associated with a user can be shared. The authorization server may allow users to opt in to or opt out of having their actions logged by social networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
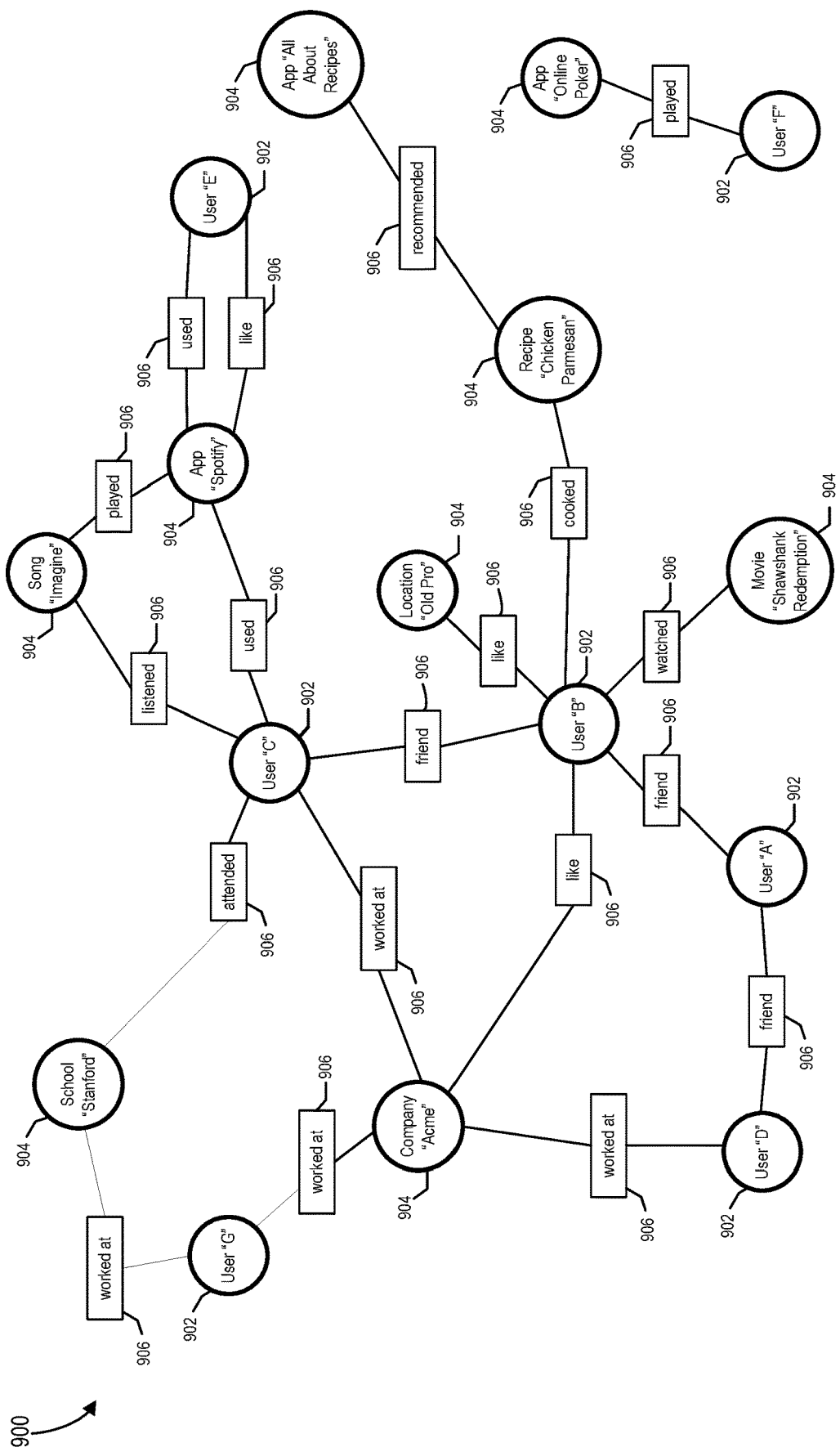
FIG. 9 illustrates a social graph in accordance with one or more embodiments.

FIG. 9 illustrates example social graph 900. In particular embodiments, social networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social networking system 802. As an example and not by way of limitation, a user may be an individual (human user), an entity (e.g., an enterprise, business, or third-party application), or a group (e.g., of individuals or entities) that interacts or communicates with or over social networking system 802. In particular embodiments, when a user registers for an account with social networking system 802, social networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social networking system 802. In particular embodiments, a user node 902 may be associated with information provided by a user or information gathered by various systems, including social networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social networking system 802. Profile pages may also be hosted on third-party websites associated with a third-party server 908. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social networking system 802 a message indicating the user's action. In response to the message, social networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social networking system 802 a message indicating the user's liking of the concept associated with the concept-profile page. In response to the message, social networking system 802 may create an edge 906 between user node 902 associated with the user and concept node 904, as illustrated by "like" edge 906 between the user and concept node 904. In particular embodiments, social networking system 802 may store an edge 906 in one or more data stores. In particular embodiments, an edge 906 may be automatically formed by social networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a newsfeed or ticker item on social networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within newsfeeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 802) or RSVP (e.g., through social networking system 802) to an event associated with the advertisement. In addition or as an alternative, an advertisement may include social-networking-system context directed to the user. As an example and not by way of limitation, an advertisement may display information about a friend of the user within social networking system 802 who has taken an action associated with the subject matter of the advertisement.

In particular embodiments, social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 802 may calculate a coefficient based on a user's actions. Social networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social networking system 802 may analyze a user's actions to determine whether one or more of the actions indicate an affinity for subject matter, content, other users, and so forth. As an example and not by way of limitation, if a user may make frequently posts content related to "coffee" or variants thereof, social networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 802 may calculate a coefficient based on the type of relationship between particular objects. Referencing the social graph 900, social networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user node 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 802 may determine that the user has a higher coefficient with respect to the first photo than the second photo because having a tagged-in-type relationship with content may be assigned a higher weight and/or rating than having a like-type relationship with content. In particular embodiments, social networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social networking system 802 may determine that the user has a higher coefficient for the airport than the gas station based on the proximity of the airport to the user.

In particular embodiments, social networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 802 may provide information that is relevant to user's interests and current circumstances, increasing the likelihood that they will find such information of interest. In particular embodiments, social networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social networking system 802 may calculate the coefficient (or access the coefficient information if it has previously been calculated and stored). In particular embodiments, social networking system 802 may measure an affinity with respect to a particular process. Different processes (both internal and external to the online social network) may request a coefficient for a particular object or set of objects. Social networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
monitoring user interactions with social networking system activity user interface controls within a video application that occur as portions of a digital video play within the video application, wherein each of the social networking system activity user interface controls correspond with a type of social networking interaction with a portion of the digital video;
in response to determining that a number of monitored user interactions with one of the social networking system activity user interface controls within the video application that occurred as a portion of the digital video played within the video application satisfies a predetermined threshold, determining that the portion of the digital video is a viral portion of the digital video; and
in response to determining that the portion of the digital video is a viral portion of the digital video, providing on a playback timeline within the video application;
a first graphical indicator that highlights a portion of the playback timeline within the video to indicate a beginning and ending of the viral portion of the digital video within the playback timeline; and
a second graphical indicator, combined with the first graphical indicator that highlights the portion, indicating the type of social networking interaction associated with the viral portion that satisfied the predetermined threshold and indicating a number of interactions for the type of social networking interaction associated with the viral portion within the playback timeline.

2. The method as recited in claim 1, wherein monitoring user interactions with social networking system activity user interface controls within the video application that occur as portions of the digital video play within the video application comprises monitoring one or more of: user interactions with a like social networking activity user interface control associated with the portions of the digital video or user interactions with a share social networking activity user interface control associated with the portions of the digital video.

3. The method as recited in claim 1, wherein monitoring user interactions with social networking system activity user interface controls within the video application that occur as portions of the digital video play within the video application further comprises monitoring user interactions with a comment social networking activity user interface control associated with the digital video.

4. The method as recited in claim 1, wherein determining that the number of monitored user interactions with one of the social networking system activity user interface controls within the video application that occurred as the portion of the digital video played within the video application satisfies the predetermined threshold comprises:
identifying one or more video file layers associated with the digital video;
identifying counts, for the portion of the digital video, based on the user interactions with social networking system activity user interface controls within the video application that occurred as the portion of the digital video played within the video application as indicated by the identified one or more video file layers; and
determining a count associated with one of the social networking system activity user interface controls is greater than a predetermined amount.

5. The method as recited in claim 4, further comprising determining the predetermined threshold relative to the counts associated with additional social networking system activity user interface controls within the video application that occurred as other portions of the digital video played.

6. The method as recited in claim 1, further comprising identifying, in response to determining the viral portion of the digital video, demographic information associated with the viral portion of the digital video based on demographic information associated with the social networking system users that have interacted with the viral portion of the digital video via the social networking system activity user interface control within the video application.

7. The method as recited in claim 6, further comprising providing the identified demographic information associated with the viral portion of the digital video to one or more advertisers, wherein the identified demographic information associated with the viral portion of the digital video comprises age information, gender information, location information, social networking activity information, and profile information.

8. The method as recited in claim 1, further comprising providing, on the playback timeline within the video application, the second graphical indicator combined with the first graphical indicator during playback of the digital video to the social networking system user.

9. The method as recited in claim 1, wherein monitoring user interactions with social networking system activity user interface controls within the video application that occur as portions of the digital video play within the video application further comprises monitoring user interactions indicating a selection of a particular portion of the digital video to share the particular portion of the digital video.

10. A system comprising:
at least one processor; and
at least one non-transitory computer-readable storage medium storing instructions thereon that, when executed by the at least one processor, cause the system to:
monitor user interactions with social networking system activity user interface controls within a video application that occur as portions of a digital video play within the video application, wherein each of the social networking system activity user interface controls correspond with a type of social networking interaction with a portion of the digital video;
in response to determining that a number of monitored user interactions with one of the social networking system activity user interface controls within the video application that occurred as a portion of the digital video played within the video application satisfies a predetermined threshold, determine that the portion of the digital video is a viral portion of the digital video; and in response to determining that the portion of the digital video is a viral portion of the digital video, provide on a playback timeline within the video application;
a first graphical indicator that highlights a portion of the playback timeline within the video to indicate a beginning and ending of the viral portion of the digital video within the playback timeline; and
a second graphical indicator, combined with the first graphical indicator that highlights the portion, indicating the type of social networking interaction associated with the viral portion that satisfied the predetermined threshold and indicating a number of interactions for the type of social networking interaction associated with the viral portion within the playback timeline.

11. The system as recited in claim 10, wherein monitoring user interactions with social networking system activity user interface controls within the video application that occur as portions of the digital video play within the video application comprises monitoring one or more of: user interactions with a like social networking activity user interface control associated with the portions of the digital video, or user interactions with a share social networking activity user interface control associated with the portions of the digital video.

12. The system as recited in claim 11, wherein monitoring user interactions with social networking system activity user interface controls within the video application that occur as portions of the digital video play within the video application further comprises monitoring user interactions with a comment social networking activity user interface control associated with the digital video.

13. The system as recited in claim 12, further storing instructions thereon that, when executed by the at least one processor, cause the system to determine that the number of monitored user interactions with one of the social networking system activity user interface controls within the video application that occurred as the portion of the digital video played within the video application satisfies the predetermined threshold by:
identifying one or more video file layers associated with the digital video;
identifying counts, for the portion of the digital video, based on the user interactions with social networking system activity user interface controls within the video application that occurred as the portion of the digital video played within the video application as indicated by the identified one or more video file layers; and
determining a count associated with one of the social networking system activity user interface controls is greater than a predetermined amount.

14. The system as recited in claim 13, further comprising instructions that, when executed by the at least one processor, cause the system to determine the predetermined threshold relative to the counts associated with additional social networking system activity user interface controls within the video application that occurred as other portions of the digital video played.

15. The system as recited in claim 14, further comprising instructions that, when executed by the at least one processor, cause the system to identify, in response to determining the viral portion of the digital video, demographic information associated with the viral portion of the digital video based on demographic information associated with the social networking system users that have interacted with the viral portion of the digital video via the social networking system activity user interface control within the video application.

16. The system as recited in claim 15, further comprising instructions that, when executed by the at least one processor, cause the system to provide the identified demographic information associated with the viral portion of the digital video to one or more advertisers.

17. The system as recited in claim 10, further comprising instructions that, when executed by the at least one processor, cause the system to automatically play the viral portion of the digital video within a newsfeed of the social networking system user.

18. The system as recited in claim 10, further comprising instructions that, when executed by the at least one processor, cause the system to provide, on the playback timeline within the video application, the second graphical indicator combined with the first graphical indicator during playback of the digital video to the social networking system user.

19. A non-transitory computer readable medium storing instructions thereon that, when executed by at least one processor, cause a computer system to:
monitor user interactions with social networking system activity user interface controls within a video application that occur as portions of a digital video play within the video application, wherein each of the social networking system activity user interface controls correspond with a type of social networking interaction with a portion of the digital video;
in response to determining that a number of monitored user interactions with one of the social networking system activity user interface controls within the video application that occurred as a portion of the digital video played within the video application satisfies a predetermined threshold, determine that the portion of the digital video is a viral portion of the digital video; and
in response to determining that the portion of the digital video is a viral portion of the digital video, provide on a playback timeline within the video application;
a first graphical indicator that highlights a portion of the playback timeline within the video to indicate a beginning and ending of the viral portion of the digital video within the playback timeline; and
a second graphical indicator, combined with the first graphical indicator that highlights the portion, indicating the type of social networking interaction associated with the viral portion that satisfied the predetermined threshold and indicating a number of interactions for the type of social networking interaction associated with the viral portion within the playback timeline.

20. The non-transitory computer readable medium as recited in claim 19, further storing instructions thereon that, when executed by the at least one processor, cause a computer system to determine that the number of monitored user interactions with one of the social networking system activity user interface controls within the video application that occurred as the portion of the digital video played within the video application satisfies the predetermined threshold by:
identifying one or more video file layers associated with the digital video;
identifying counts, for the portion of the digital video, based on the user interactions with social networking system activity user interface controls within the video application that occurred as the portion of the digital video played within the video application as indicated by the identified one or more video file layers; and
determining a count associated with one of the social networking system activity user interface controls is greater than a predetermined amount.

* * * * *